(12) United States Patent
Swierczewski

(10) Patent No.: US 8,641,140 B2
(45) Date of Patent: *Feb. 4, 2014

(54) VEHICLE SAFETY SEAT

(76) Inventor: Richard Swierczewski, Toms River, NJ (US)

( * ) Notice: Subject to any disclaimer, the term of this patent is extended or adjusted under 35 U.S.C. 154(b) by 190 days.

This patent is subject to a terminal disclaimer.

(21) Appl. No.: 13/065,037

(22) Filed: Mar. 11, 2011

(65) Prior Publication Data

US 2011/0227378 A1    Sep. 22, 2011

Related U.S. Application Data

(63) Continuation-in-part of application No. 12/661,503, filed on Mar. 17, 2010, now Pat. No. 8,297,698.

(51) Int. Cl.
*B60R 21/00* (2006.01)
*B60N 2/42* (2006.01)

(52) U.S. Cl.
USPC .............. 297/216.15; 297/216.1; 297/216.19; 297/216.2

(58) Field of Classification Search
USPC ............... 297/216.1, 216.15, 216.16, 216.19, 297/216.2
See application file for complete search history.

(56) References Cited

U.S. PATENT DOCUMENTS

| 2,102,979 | A |   | 12/1937 | Smith |  |
|---|---|---|---|---|---|
| 2,335,340 | A |   | 11/1943 | Koppelman |  |
| 2,433,950 | A |   | 1/1948 | Henderson |  |
| 2,660,222 | A |   | 11/1953 | Woodsworth |  |
| 2,735,476 | A |   | 2/1956 | Fieber |  |
| 2,736,566 | A |   | 2/1956 | Hartl |  |
| 2,823,730 | A | * | 2/1958 | Lawrence | 297/216.2 |
| 3,463,543 | A | * | 8/1969 | Zellar | 297/216.2 |
| 3,471,197 | A |   | 10/1969 | Ely |  |
| 3,578,376 | A |   | 5/1971 | Hasegawa et al. |  |
| 3,731,972 | A | * | 5/1973 | McConnell | 297/216.19 |
| 3,953,068 | A |   | 4/1976 | Porsche et al. |  |
| 4,154,472 | A |   | 5/1979 | Bryll |  |
| 4,349,167 | A |   | 9/1982 | Reilly |  |
| 5,022,707 | A | * | 6/1991 | Beauvais et al. | 297/216.2 |
| 5,125,598 | A |   | 6/1992 | Fox |  |
| 5,295,729 | A |   | 3/1994 | Viano |  |

(Continued)

FOREIGN PATENT DOCUMENTS

JP    2005-205939 A    8/2005

OTHER PUBLICATIONS

Richard Swierczewski, Contents of inventor's website, posted to internet in Jul. 2010, removed from internet Mar. 2011.

*Primary Examiner* — Philip Gabler
(74) *Attorney, Agent, or Firm* — Thomas Swenson

(57) ABSTRACT

A vehicle safety seat (104, 202, 302, 502, 802) includes a seat bottom (120, 210, 310, 504, 810) that is movable substantially instantly from a substantially horizontal normal orientation for normal traveling to a deployed angled orientation contemporaneously with a vehicle crash. The deployed safety seat shifts a seat occupant (102) into a protective posture to reduce accelerations, loads and moments of force on various parts of the occupant's body. In preferred embodiments, the seat bottom is deployed into its angled orientation by lowering the rear (124, 312, 507, 812) of the seat bottom, causing the seat bottom to pivot about a front pivot (174, 220, 320, 518, 820) at the front of the seat bottom. Typically, a vehicle safety seat includes a backrest (130, 240, 360, 550, 840). In some embodiments, a backrest (130, 240, 360, 550) is movable downwards and/or rearwards simultaneously with movement of the seat bottom.

22 Claims, 16 Drawing Sheets

(56) References Cited

U.S. PATENT DOCUMENTS

| | | | |
|---|---|---|---|
| 5,449,214 A * | 9/1995 | Totani .................. 296/68.1 |
| 5,460,427 A | 10/1995 | Serber |
| 5,556,160 A | 9/1996 | Mikami |
| 5,567,006 A | 10/1996 | McCarthy |
| 5,605,372 A | 2/1997 | Al-Abdullateef |
| 5,636,424 A | 6/1997 | Singer |
| 5,967,604 A | 10/1999 | Yoshida et al. |
| 6,022,074 A | 2/2000 | Swedenklef |
| 6,244,656 B1 | 6/2001 | Mueller |
| 6,257,663 B1 | 7/2001 | Swierczewski |
| 6,435,591 B1 | 8/2002 | Nilsson |
| 6,742,838 B1 | 6/2004 | Swierczewski |
| 6,851,747 B2 * | 2/2005 | Swierczewski .......... 297/216.19 |
| 7,140,682 B2 | 11/2006 | Jaeger et al. |
| 2007/0262604 A1 | 11/2007 | Takei et al. |
| 2010/0066116 A1 | 3/2010 | Coenen |
| 2010/0283302 A1 | 11/2010 | Fukuda |
| 2011/0210586 A1 | 9/2011 | Masutani |

* cited by examiner

VEHICLE SAFETY SEAT

RELATED APPLICATIONS

This application is a continuation-in-part application, claiming priority under 35 USC 120, of U.S. patent application Ser. No. 12/661,503, filed Mar. 17, 2010, by Swierczewski, having the title "Mechatronic Vehicle Safety Seat", now U.S. Pat. No. 8,297,698.

FIELD OF THE INVENTION

The present invention relates to the field of vehicle seats, particularly to apparatuses, systems and methods for transforming seat geometry contemporaneously with a vehicle crash to protect a seat occupant.

BACKGROUND ART

Every year, vehicle crashes cause millions of deaths and serious injuries worldwide among occupants of automobiles, planes, trains and other modes of transportation. For example, in the United States alone, roughly 2.7 million automobile injuries occur annually, causing approximately $230 billion damage.

Occupants of automobile front seats account for about 90 percent of all auto fatalities. Importantly, about 45 percent of occupants killed in automobile accidents wear seat belts. Only 24 percent of tested car seats obtained a satisfactory rating in a study by the Insurance Institute for Highway Safety (IIHS) reported in 2007. Yet, some safety experts have identified vehicle seats as one of the most potentially effective life saving devices available, and have encouraged automobile manufacturers to improve seating systems in terms of comfort, ergonomics and safety.

Currently, auto seat designers trying to develop safer seating systems are pursuing two conflicting approaches. One general approach is to increase rigidity of the seat structure. The second approach is to use plastically deformable materials to produce yielding seat components.

The automotive industry concentrates its attention mostly on the protection of occupants during rear end collisions, even though whiplash injuries from rear end collisions cause only about 25 percent of all expenditures paid by insurance agencies.

Some successful improvements to occupant protection have derived from recently developed pre-crash detection technology that determines when a crash is imminent and activates vehicle subsystems for corrective action before impact occurs.

Numerous measures have been implemented in the vehicle manufacturing industries over the past decades in attempts to reduce deaths, injuries and monetary damages resulting from vehicle crashes. Examples include seat belts, airbags, head restraints, improved compartment design, and exterior changes, such as vehicle crumple zones. While being helpful in some situations, some measures are known to exacerbate injuries in other situations. For example, in some vehicle crashes, the shoulder sash of a seat belt system causes undesirable pressure to the throat, neck or head of the occupant. In some vehicle crashes, an airbag interferes with operator control of an automobile or actually injures a seat occupant.

Generally, designers of vehicle interiors and vehicle seats accept an occupant's pre-impact posture as uncontrolled. Some vehicle seat designers have attempted to mitigate crash effects using various alternative approaches, such as energy absorption and occupant posture control.

U.S. Pat. No. 6,631,955, issued Oct. 14, 2003, to Humer et al., discloses a variable movement headrest to provide head support to a vehicle occupant by quickly decreasing the gap between an occupant's head and the headrest. U.S. Pat. No. 7,588,289, issued Sep. 15, 2009, to Boström et al., discloses a vehicle seat having a headrest that moves forward in a manner depending on the severity of an impact. U.S. Patent Application Publication No. 2009/0108645, published Apr. 30, 2009, by Nilakantan, teaches an active head restraint system that is actuated before an occupant is thrown rearward against a backrest. U.S. Pat. No. 6,022,074, issued Feb. 8, 2000, to Swedenklef, teaches a seat suitable for damping the effects of a high-pressure impact against the seat backrest by the occupant of the seat, which seat includes a backrest element mounted on a squab for pivotal movement relative to the squab.

U.S. Pat. No. 7,354,106, issued Apr. 8, 2008, to Dennis, discloses a vehicle safety seat useful in aircraft and small sea-going vessels, in which a seated occupant is accelerated upward a fraction of a second after initial crash impact, thereby reducing downward velocity and avoiding compressive axial forces on the spine. U.S. Pat. No. 5,553,924, issued Sep. 10, 1996, to Cantor et al., discloses a contoured seat bottom with an energy-absorbing foam layer covered by a second foam layer having a rate sensitive compression characteristic.

U.S. Pat. No. 3,953,068, issued Apr. 27, 1976, to Porsche et al., discloses a passenger seat having a backrest pivotally attached to a seat rest in which energy absorption devices dissipate and absorb collision and/or deceleration forces acting on the seat or a passenger in the seat. U.S. Pat. No. 5,556,160, issued Sep. 17, 1996, to Mikami, discloses a seat bottom that rotates from a seating position to an inclined position, in which the rear of the seat bottom is below the knees of a seated person, in order to prevent the seated person being flung forward by forces of inertia. U.S. Pat. No. 6,851,747, issued Feb. 8, 2005, to Swierczewski, discloses a collapsible vehicle safety seat designed upon impact to lower the center of gravity of an occupant.

There is a need for vehicle seats that protect vehicle occupants, reduce injuries, are cost effective, and are compatible with conventional vehicle equipment, compartment spaces and designs.

SUMMARY OF THE INVENTION

The present invention helps to alleviate some of the problems mentioned above and improves the safety of seat occupants. Devices, systems and methods in accordance with the invention are useful for transforming seat geometry contemporaneously with the vehicle crash from a normal configuration into a deployed configuration.

A safety seat deploys into a geometrically modified seat configuration to shift a safety seat occupant into a safe posture in anticipation of and during a crash, notwithstanding particular conditions such as vehicle design, seating environment, crash conditions, and an occupant's anatomy and initial position on impact. Characteristic benefits of the safe posture include: increased headspace, reduced backset, and constrained occupant movement. Among other benefits, a vehicle safety seat in accordance with the invention reduces or eliminates the need for airbags, especially frontal airbags in a steering wheel.

A vehicle safety seat in accordance with the invention applies a novel approach to seat design and operation based on an understanding of the mechanistic causes of injury and the recognition of the human body as a complex system. A vehicle safety seat departs from a conventional premise of vehicle and seat designers that an occupant's impact posture is uncontrollable.

A safety seat utilizes gravitational-inertial forces to deploy into a geometrically modified seat configuration for crash conditions. In preferred embodiments, one or more means for applying mechanical bias, such as a torsion spring, facilitate rapid transformation of the safety seat into a deployed configuration.

An exemplary basic embodiment of a vehicle safety seat comprises a seat bottom having a front region and a rear region. The seat bottom is movable contemporaneously with a vehicle crash substantially instantly from a normal horizontal orientation for normal traveling conditions to a deployed angled orientation. Accordingly, a vehicle safety seat generally further comprises a means for moving the seat bottom from a substantially horizontal orientation into a corresponding deployed angled orientation.

In some preferred embodiments, a safety seat comprises a seat belt.

Embodiments typically further comprise a substantially vertical backrest. In some embodiments, the backrest remains substantially stationary and unchanged during a vehicle crash when the seat bottom is deployed into an angled orientation. In some embodiments, the backrest is movable contemporaneously with a crash substantially instantly from a normal backrest position for normal traveling conditions to a deployed backrest position. In some embodiments, the backrest is movable only rearwards to the deployed backrest position. In some embodiments, the backrest is movable only downwards to the deployed backrest position. Downward movement of the backrest is especially important in safety seats designed to work in conjunction with a 3-point seat belt or other belt system having a shoulder sash. In some embodiments, the backrest is movable both rearwards and downwards to the deployed backrest position. Accordingly, such embodiments of a vehicle safety seat generally further comprise a means for moving the backrest from the normal backrest position to the deployed backrest position, preferably substantially simultaneously with movement of the seat bottom from the substantially horizontal orientation into the deployed angled orientation. Preferably, a deployed backrest position is substantially parallel to its preceding normal backrest position. In preferred embodiments, a head restraint is associated with the backrest.

In a normal horizontal orientation, a seat bottom is substantially parallel to the vehicle floor. In a deployed angled orientation, the rear region is at least about 10 centimeters (cm) lower than the seat bottom rear region in the normal orientation. In a deployed angled orientation, the rear region generally is in a range of about from 10 cm to 45 cm lower than the rear region in a normal orientation. The height of the bottom rear region above the floor is preferably in a range of about 13 cm to 40 cm lower, and more preferably in a range of about from 16 cm to 26 cm lower, than in its normal orientation. The height of the rear top surface of the seat bottom above the floor in a deployed angled orientation is typically in a range of about from 5 cm to 15 cm, depending on thickness and vertical distance traveled from normal height to deployed height. A safety seat comprises a front pivot at the front region, and the seat bottom is rotatable about the front pivot. Thus, the front region of the seat bottom in the deployed angled orientation is not substantially higher or lower relative to the vehicle floor than the front region of the seat bottom in the horizontal orientation of normal conditions. A feature of embodiments in accordance with the invention is that in the deployed angled orientation, the rear region is typically at least about 12 cm lower than the front region. In the deployed angled orientation, the rear region is typically in a range of about from 12 cm to 42 cm lower than the front region. Some embodiments comprise a rear support having an upper end and a lower end, the upper end being connected to the rear region. The rear support is movable downwards contemporaneously with a vehicle crash. A downward movement of the rear support lowers the frame rear and causes the seat bottom to rotate partially about the front pivot from the substantially horizontal orientation for normal traveling conditions to the deployed angled orientation. In its deployed angled orientation, the seat bottom typically forms an angle to the vehicle floor in a range of about from 25° (degrees) to 50°.

Some preferred embodiments further comprise a pre-crash detection system operable to initiate deployment of a vehicle safety seat from a normal configuration for normal traveling conditions to a deployed configuration.

In some preferred embodiments, the seat bottom comprises a rear section that slants upwards and rearwards from the substantially horizontal plane of the seat bottom in normal horizontal orientation. The rear section serves to support and protect the posterior of a seat occupant when the safety seat is in a deployed configuration.

In some preferred embodiments, the seat bottom comprises a frontal section that extends substantially vertically downwards from the substantially horizontal top plane of the seat bottom in a normal horizontal orientation. When the seat bottom is in a deployed angled orientation, the frontal section extending substantially horizontally forwards and serves to support and protect the lower legs of a seat occupant.

An exemplary basic embodiment of a method of transforming the geometry of a safety seat to protect a seat occupant, comprises moving a seat bottom contemporaneously with a vehicle crash substantially instantly from a substantially horizontal orientation to a deployed angled orientation in which a rear region of the seat bottom is lower than a front region of the seat bottom. Preferably, in the deployed angled orientation, the rear region is at least about 10 cm lower than the rear region in the normal orientation. Some embodiments further comprise moving a substantially vertical backrest from a normal backrest position to a deployed backrest position by moving the backrest rearwards and downwards to the deployed backrest position substantially instantly and contemporaneously with the vehicle crash. The backrest in the normal backrest position generally defines a backrest angle with respect to the vehicle floor. Preferably, the backrest in the deployed backrest position defines a substantially equal angle.

Sled test measurements show that various parts of a safety seat occupant's body experience less severe accelerations, loads, and moments of force as a result of a crash than if the occupant were in a conventional vehicle seat. It is an object of a safety seat in accordance with the invention to utilize effectively a seat occupant's habitual response mechanisms and natural protective reflexes to assume a safe body posture that is able to withstand crash impact forces better than if he were in a conventional vehicle seat.

The active function of a vehicle safety seat in accordance with the invention restrains an occupant, controlling and reducing occupant kinematics. A safety seat improves the safety performance of seat belts by reducing loads applied to the occupant's shoulder and torso. A safety seat reduces the aggressiveness of air bags, further reducing occupant injury. Moreover, in some cases, a safety seat obviates steering wheel airbags, which frequently interfere with driver visibility in crash situations. Importantly, a vehicle safety seat in accordance with the invention enhances protection of occupants in lightweight, fuel-efficient vehicles by diminishing the effect of a collision with a heavier and stiffer vehicle.

The design and construction of conventional vehicle seats is already well known in the art. A feature of embodiments of safety seats in accordance with the present invention is that they are compatible with the design techniques, geometry, spatial constraints and construction materials generally used in the field of vehicle seats.

Other features, characteristics and advantages of embodiments in accordance with the invention will become apparent from consideration of the description and drawings below.

BRIEF DESCRIPTION OF THE DRAWINGS

A more complete understanding of the invention may be obtained by reference to the drawings, in which.

DETAILED DESCRIPTION OF THE INVENTION

Figure 1:
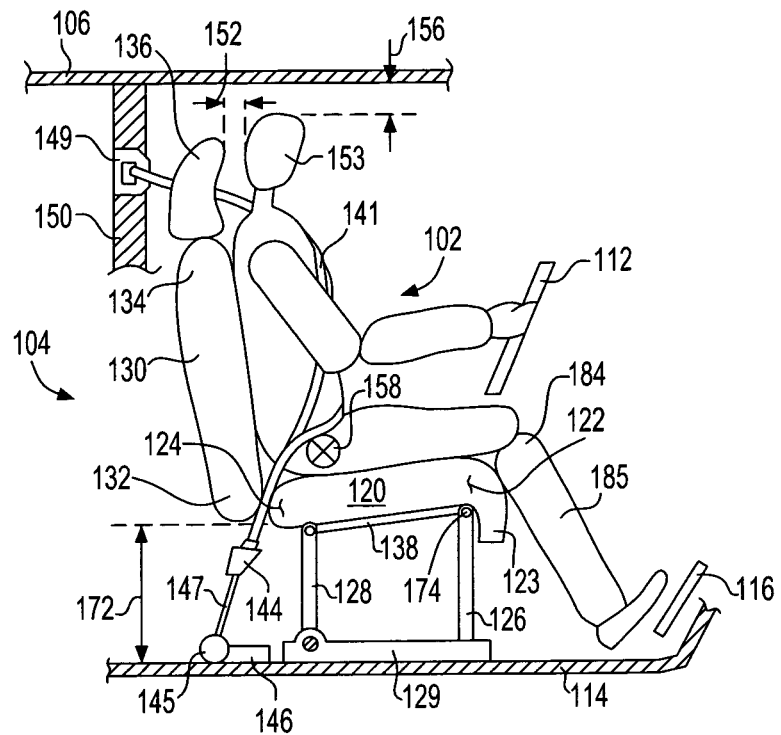
FIG. 1 depicts a side view of a seat occupant in a vehicle safety seat in accordance with the invention disposed in a normal configuration for normal traveling conditions.

The invention is described herein with reference to FIGS. 1-28. It should be understood that FIGS. 1-18, 21-28, depicting embodiments of apparatuses and methods in accordance with the invention, are not meant to be actual views or diagrams of any particular portion of an actual equipment component, apparatus or process. The figures instead show idealized representations that are employed to explain more clearly and fully the structures, systems and methods of the invention than would otherwise be possible. Also, the figures represent only one of innumerable variations of structures and systems that could be made or adapted to use a method in accordance with the invention. Devices and methods are described with numerous specific details in order to provide a thorough understanding of the present invention. It will be obvious to one skilled in the art that embodiments in accordance with the invention can be practiced using structures, devices and process steps different from those described with reference to FIGS. 1-28. For example, safety seats are depicted herein generally having two front support legs and two rear support legs even though some embodiments in accordance with the invention comprise a single front support and/or a single rear support. Thus, the preferred embodiments described herein are exemplary and are not intended to limit the scope of the invention, which is defined in the claims below.

For the sake of clarity, in some of the figures below, the same reference numeral is used to designate structures and components that are the same or are similar in the various embodiments described.

The term "vehicle" is used broadly to include all forms of private, commercial and public transportation and conveyance means in which a person (a human being) may travel as an operator or a passenger in a sitting position. Accordingly, the term "vehicle" and related terms include passenger automobiles, vans, buses, airplanes, railroad cars, trolleys, streetcars, cable cars, motorized carts, freight trucks, helicopters, race cars, ferry boats and high speed boats, among others.

The terms "vehicle safety seat" and "safety seat" are generally used in the specification in a broad sense to refer to a combination of various components assembled to function together in accordance with the invention. For example, the term "vehicle safety seat" may be used to refer generally to an assembly including a seat bottom frame, a backrest frame, a head restraint, corresponding cushions (if any), a recliner, a seatbelt system, and adjustment mechanisms, among other elements. The terms "vehicle safety seat" and "safety seat" are also sometimes used in a narrower sense to refer to a smaller set of seat elements, such as a seat bottom portion and a backrest portion. The meaning is clear from the context of use.

A feature of embodiments in accordance with the invention is that typically they are constructed using parts, materials and assembly techniques common in the field of vehicle seats. Embodiments are compatible with existing production techniques, such as forming, welding, and clamping, riveting, pressing and high-pressure insertion of metal parts. For the sake of clarity in the specification, major parts of a safety seat, such as seat bottom frames and backrests, are depicted in the figures as a homogeneous material, such as a metal sheet. One of ordinary skill in the art will understand, however, that actual safety seat frames often comprise an assembly of tubes, plates, stamped and machined parts, and rigid wires, including various types of materials. Although some embodiments of vehicle safety seat frames described in the specification are typically designed principally using metal parts and assembly techniques common in the field of vehicle seats, one of ordinary skill in the art will also recognize that safety seat frames in accordance with the invention may also be constructed using other commercially available materials and techniques; for example, using hard plastic or composite frame materials integral with seat cushions. Some embodiments described in the specification include one or more seat frame elements covered by one or more cushions. One skilled in the art will recognize that some embodiments in accordance with the invention do not include cushions as commonly perceived. For example, some embodiments include one or more basic seat elements that function as both frame and sitting surface. For example, some safety seats include a seat bottom and backrest consisting essentially of wood or plastic that function both as frame and as sitting surface, with none or very little covering or cushioning, such as safety seats installed in mass transit vehicles. Accordingly, the term "frame" is used in a broad sense also to include structures that serve as a sitting surface as well as structures that are covered by other materials, such as foam cushions. Disclosure of a location, an orientation or a movement of a safety seat element, such as a seat bottom frame or a backrest frame, that is commonly covered by or integral with a cushion or other material, implicitly and inherently discloses a corresponding location, orientation or movement of the cushion or other material. Similarly, disclosure of a location, an orientation or a movement of a safety seat "bottom" or a safety seat "backrest" that comprises one of more integrated or associated parts, such as a frame part together with a cushion part, implicitly and inherently discloses a corresponding location, orientation or movement of all corresponding integrated and associated parts.

The term "cushion" in reference to a safety seat is used in its usual sense to denote a somewhat pliant object selected for one or more qualities, such as comfort, aesthetics, energy-damping ability, durability and others. The term "cushion" is used also in a broader sense to include any seat material or seat surface intended for contact with a sitting seat occupant.

The term "crash" includes any impact of a vehicle against one or more stationary or moving objects. Accordingly, "crash" includes vehicle-on-vehicle collisions as well as all other occurrences involving an impact of a moving vehicle, such as a train derailment or an airplane crash. The term "crash" is also used in a broad sense to include any occurrence causing an abrupt change in velocity, momentum or acceleration of a vehicle or of a vehicle's occupant, such as the impact of a moving object against a stationary vehicle.

Conceptually, a vehicle crash is commonly considered to involve three impact stages. A first impact occurs when the vehicle strikes (or is struck by) another object. The second impact involves a vehicle occupant striking one or more objects in the occupant's compartment, such as a steering wheel, a dashboard, a windshield and a vehicle roof, in response to deceleration forces. A third impact stage occurs when at least one of the occupant's internal organs strikes against another organ because of their different weights and masses; for example, an impact of a kidney against the skeleton. In this specification, terms such as "before a collision", "before a crash", "after a crash" and other relative time references regarding a vehicle crash refer to the time of the first, or initial, crash impact.

The term "horizontal" as used in the specification is a relative term that generally refers to an orientation substantially parallel to the plane of a vehicle floor (or floor pan). Typically, a safety seat is oriented so that a person sits on a substantially flat seat bottom that is substantially parallel to true horizontal if the particular vehicle were supported by a truly horizontal flat and level surface of the earth (e.g., an ocean). Accordingly, the term "horizontal" refers to an orientation substantially parallel to floor 114, 216, 350, 816 depicted in FIGS. 1-9, 23-26, even though the travel path of a moving vehicle often deviates from true horizontal. Also, a safety seat bottom is often designed or adjusted to slant slightly downward from front to back so that it is not truly horizontal even though it is substantially horizontal for normal traveling conditions. Accordingly, the terms "horizontal" and "substantially horizontal" are relative terms used synonymously to include deviations from parallel to a vehicle floor, for example, deviations in a range of 1° to 15°.

The term "vertical" is used in the specification in a usual sense to refer to an orientation substantially perpendicular to "horizontal" as defined above. The terms "vertical" and "substantially vertical" are used synonymously to include deviations from perfectly perpendicular (90° angle) to "horizontal" as defined above; for example, deviations in a range of 1° to 20°.

Other terms of orientation, such as "forwards", "rearwards", "upper", "lower", "top", "bottom", "upwards", "downwards", are used in their usual sense as applied to frames of reference based on FIGS. 1-18; 21-26.

The terms "floor" and "floor pan" are used interchangeably.

The terms "contemporaneous" and "contemporaneously" are used in this specification in their usual sense to express "in or during the same period of time", but not necessarily at exactly the same time. In particular, the term "contemporaneously with a vehicle crash" and similar terms are used to indicate that one or more events or method steps related to transformation of seat configuration occur during the same overall time period as a vehicle crash. In accordance with the invention, one or more events or method steps related to transformation of seat configuration may occur slightly before a first impact in a vehicle crash, at the same time as a first impact, or slightly after a first impact. In the case of an automobile crash, slightly before a first impact generally means within a timeframe less than two seconds before a first impact, but often within a timeframe less than 100 milliseconds before a first impact. Under some crash conditions, activation of seat transformation mechanisms may begin substantially simultaneously or even slightly after a first impact while still providing benefits to a seat occupant. A feature of some embodiments in accordance with the invention is that the deployment of seat geometry from a normal traveling configuration to a deployed configuration, with concurrent repositioning of an occupant into a safe posture, progresses so quickly that it provides benefits of reduced bodily injury within 10 ms of activation. In some embodiments, deployment of seat geometry from a normal configuration to a deployed configuration is completed less than 40 ms after activation is initiated. Accordingly, the terms "immediately", "instantly", "substantially instantly" and similar terms generally denote a time period short enough for effective deployment. One skilled in the art will recognize that critical time frames in the case of certain types of vehicle accidents are longer than others. For example, automobile accidents often occur so quickly that a human operator, a pre-crash detection system or another crash type detector preferably is able to detect an imminent crash and react within milliseconds of the crash becoming imminent. In contrast, accidents involving airplanes and trains often afford longer critical detection and reaction times, perhaps measured in seconds rather than milliseconds. In other words, one skilled in the art will recognize that the term "contemporaneous" may vary slightly depending on context. The terms "concurrent", "simultaneous", and related terms are sometimes used in this specification more or less synonymously with the term "contemporaneous".

As one skilled in the art will recognize, a seat bottom typically comprises a seat bottom frame having one or more structural elements and a seat bottom cushion having one or more elements that cover at least a part of the seat bottom frame. Similarly, a seat backrest typically comprises a backrest frame having one or more structural elements and a backrest cushion having one or more elements that cover at least a part of the backrest frame. Some safety seats further comprise a head restraint that typically includes a head restraint frame covered by a head restraint cushion. Depending on the context in the specification, the term "seat bottom" and related terms may refer to an assembly including both frame and cushion, or it may refer principally to either a seat bottom cushion or seat bottom frame. Similarly, the terms "backrest" and "head restraint" may refer to an assembly including frame and cushion, or specifically to a frame portion or cushion portion.

The term "backset" is used in a broad sense to denote the shortest distance between the back of a seat occupant's head and either a head restraint or a backrest. In some embodiments, the head restraint is integral with the backrest and so there is no clear distinction between backrest and head restraint. In some actual implementations of embodiments in accordance with the invention, depending on particular seat dimensions and occupant dimensions, the head of the occupant in a deployed seat configuration is at a lower height that the head restraint, so that the backset is logically defined by the distance between the back of the head and the backrest cushion.

The term "H-point" (hip point) has the common industry meaning of the theoretical location of a seated occupant's hip relative to the vehicle floor pan. Recently, the global trend in the automotive industry is a higher H-point to provide occupants more legroom, better visibility and ease of entry and egress. This trend is compatible with the design of vehicle safety seats in accordance with the invention, which sometimes utilize a relatively high H-point of a seat in normal configuration to provide advantageous seat geometry in a deployed configuration.

The meaning of the term "posture" includes the position and location of the body generally and of the various body parts of a person occupying a vehicle safety seat.

The term "normal" is used in the specification principally to denote a configuration, orientation, position or posture typical or characteristic of normal traveling conditions. The term "normal", however, is not used in this specification to denote perpendicular. The terms "deployed", "deploy" and related terms are used principally with reference to configurations, orientations, positions and actions in accordance with the invention associated with vehicle crash conditions.

In some embodiments, a safety seat's geometry and other characteristics are adjustable within set ranges to enhance comfort, good posture, good visibility and other variables during normal traveling conditions. Therefore, for some safety seats, there is no one single normal configuration. Rather, there are numerous different possible normal configurations within limited variable ranges. Typically, a deployed configuration is determined partially by the particular normal configuration existing when deployment is initiated. Accordingly, a particular deployed configuration of a safety seat corresponds at least partially to a particular normal configuration of a safety seat at the initiation of deployment. For example, a front pivot point in a safety seat might be adjustable in a normal configuration within a vertical range of 4 cm. Accordingly, the height of the front pivot in the safety seat in deployed configuration is typically determined by the particular height of the front pivot in the normal configuration immediately before initiation of deployment.

FIG. 1 depicts schematically a side view of a seat occupant 102 sitting on a preferred embodiment of a vehicle safety seat 104 in accordance with the invention. Safety seat 104 in FIG. 1 is disposed in a normal configuration for normal traveling conditions. Safety seat 104 as described here is a driver-side, passenger automobile seat. One of ordinary skill in the art will recognize that a safety seat 104 may be adapted for use in other types of vehicles, such as buses and trucks. Side view of FIG. 1 also depicts a portion of a vehicle compartment in which occupant 102 and safety seat 104 are disposed, the vehicle compartment comprising roof 106, steering wheel 112, floor 114 and accelerator pedal 116. For the sake of clarity, the facia (or dashboard) and firewall are not depicted. Safety seat 104 comprises seat bottom cushion 120 having a front region 122 and a rear region 124. Some preferred embodiments comprise a frontal section 123 extending downwards from front region 122. In its normal horizontal orientation for normal traveling conditions, seat bottom cushion 120 is substantially parallel to vehicle floor 114. Vehicle safety seat 104 further comprises a front support 126 and a rear support 128 that support the seat bottom cushion 120. The lower ends of front support 126 and a rear support 128 are coupled to a seat adjustment mechanism 129. Safety seat 104 further comprises a backrest cushion 130 having a lower region 132 and an upper region 134. As depicted in FIG. 1, safety seat 104 preferably further comprises a head restraint cushion 136 located proximate to upper region 134 of backrest cushion 130. In some embodiments, head restraint cushion 136 is an extended portion of backrest cushion 130. In preferred embodiments, head restraint cushion 136 is separate from backrest cushion 130 and is assembled in safety seat 104 using techniques known in the art. Safety seat 104 typically includes a safety seat frame to which cushions 120, 130, 136 are attached. For example, seat bottom cushion 120 is mounted on seat bottom frame 138.

As depicted in FIG. 1, safety seat 104 preferably further comprises a three-point seatbelt assembly that includes a seat belt 141, a buckle 144, a pretensioner mounting bracket 145, a locking unit 146, a pretensioner cable 147, a belt rolling device (BRD) 148, and a shoulder anchor 149 attached to B-pillar (vehicle wall) 150. One skilled in the art will recognize that many different variations of seat belt assemblies are commercially available and are useful in accordance with the invention. For example, some embodiments include a belt-in-seat (BIS).

As depicted in FIG. 1, during normal traveling conditions, a backset gap 152 typically is located between the head restraint 136 and the back of the seat occupant's head. The size of backset 152 typically depends on the overall seat design and dimensions, the dimensions of the occupant, and on variable seat adjustment settings (if any). A "headspace" gap 156 is located between the top of the occupant's head 153 and the roof 106. The size of headspace 156 typically depends on the overall seat design and dimensions, the dimensions of the occupant, and on variable seat adjustment settings (if any). The side view of FIG. 1 depicts H-point 158. Preferably, rear support 128 is located beneath H-point 158 in normal configuration.

Figure 2:
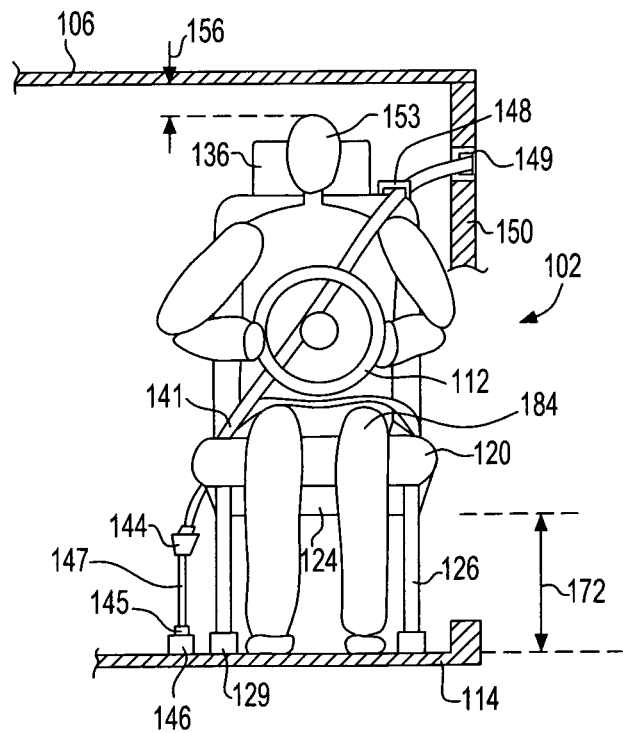
FIG. 2 depicts a front view of the seat occupant and safety seat of FIG. 1.

FIG. 2 depicts schematically a front view of seat occupant 102 sitting on safety seat 104 disposed in the normal configuration for normal traveling conditions. Vertical distance 172 measures the height of rear portion 124 above floor 114. Upon activation of safety seat 104 contemporaneously with a crash (a short time before, at the same time or shortly after a first impact), safety seat 104 deploys substantially instantly from a normal configuration for normal travel conditions to a deployed configuration.

Figure 3:
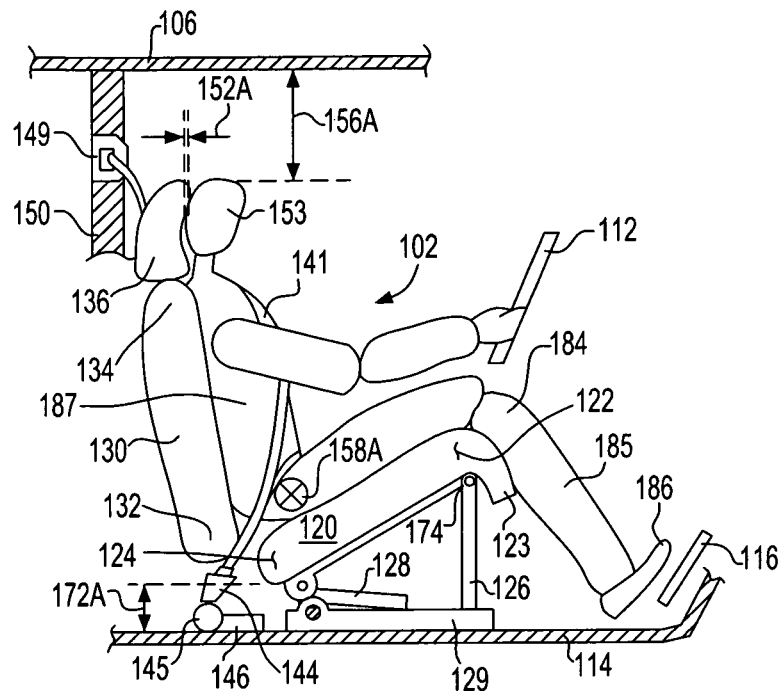
FIG. 3 depicts a side view of the seat occupant and safety seat of FIG. 1 in a deployed seat configuration contemporaneous with a vehicle crash.
Figure 4:
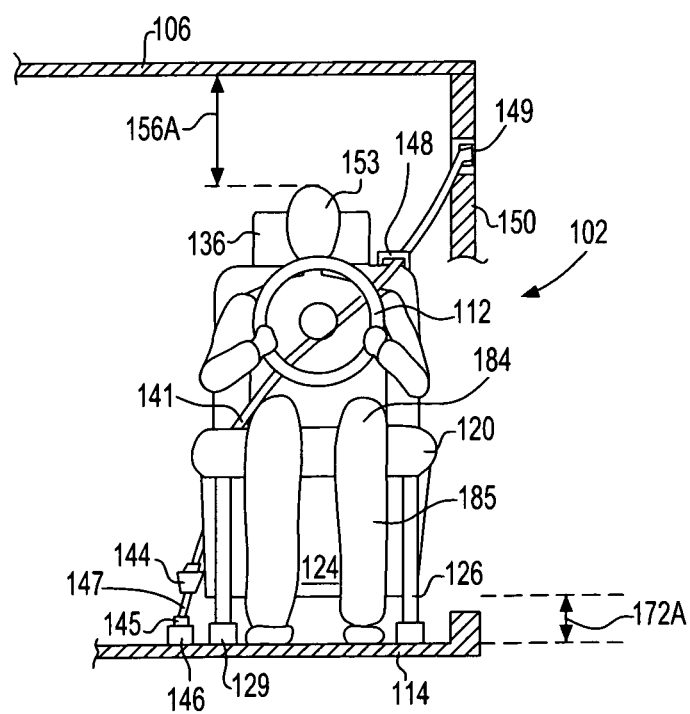
FIG. 4 depicts a front view of the seat occupant and deployed safety seat of FIG. 3.

FIG. 3 depicts schematically a side view of seat occupant 102 and of safety seat 104 in a deployed seat configuration contemporaneous with a vehicle crash. FIG. 4 depicts schematically a front view of seat occupant 102 and vehicle safety seat 104 in a deployed seat configuration contemporaneous with a vehicle crash. As depicted in FIGS. 3 and 4, seat bottom cushion 120 has moved from a normal substantially horizontal orientation (FIG. 1) to a deployed angled orientation in which rear region 124 is substantially lower than rear region 124 in its normal orientation. Also, backrest cushion 130 has moved rearwards and downwards from a normal backrest position to a deployed backrest position. Generally, rear region 124 is lowered by lowering rear support 128, as described in more detail further below. The height of bottom cushion rear region 124 above floor 114 indicated by vertical distance 172A typically is at least about 10 cm lower than rear region 124 in its normal orientation (height 172 in FIG. 2). Generally, rear region 124 is in a range of about from 13 cm to 40 cm lower than in its normal orientation, preferably in a range of about from 15 cm to 26 cm lower than in its normal orientation. In a horizontal orientation for normal traveling conditions as depicted in FIG. 1, seat bottom cushion 120 is typically adjusted into a slightly slanted orientation to maximize traveling comfort. For example, in some embodiments in a nominally horizontal orientation for normal traveling, rear region 124 of bottom cushion 120 is located in a range of about from 2 cm to 6 cm lower than front region 122, and the approximately planar sitting surface of seat bottom cushion 120 forms an angle in a range of about from 2° (degrees) to 10° with the approximate plane of floor 114. In its deployed angled orientation as depicted in FIGS. 3 and 4, rear region 124 is typically at least about 12 cm lower than said front region. Generally, in a deployed angled orientation, rear region 124 is in a range of about from 12 cm to 42 cm lower than in its normal horizontal orientation. Generally, in a deployed angled orientation, seat bottom cushion 120 forms an angle to vehicle floor 114 in a range of about from 20 degrees to 60 degrees, more typically a range of about from 30 degrees to 50 degrees. As a result, H-point position 158 (FIG. 1) is correspondingly lowered to H-point 158A. In some embodiments, H-point 158A is below the occupant's knee joints and is 8 cm or more lower than preceding H-point 158.

In some embodiments, H-point 158A is in a range of about from 8 cm to 35 cm lower than preceding H-point 158, preferably in a range of about from 13 cm to 30 cm lower than preceding H-point 158. With a lower center of gravity represented by H-point 158, occupant 102 assumes a safe posture, as depicted in FIG. 3. Seat bottom 120 in deployed angled orientation inhibits forward movement of occupant 102 resulting from forces of inertia.

For design purposes, a decrease in vertical height of rear region 214 (e.g., height 172 minus height 172A) of value Y is expected to cause an H-point height decrease of approximately 0.8Y. In preferred embodiments, the downward movement of backrest 130 is designed to accommodate the downward movement of an occupant, represented by the change from H-point 158 to H-point 158A. This is important so that seat belt 141 coupled to backrest 130 "follows" occupant 102 as he shifts into a safe posture. When backrest 130 forms a 90° angle with floor 114, the downward movement of backrest 130 preferably is about the same as the H-point height change (e.g., 0.8Y). Typically, however, backrest 130 forms an angle greater than 90°, for example, about 100° to 115°, so that a corresponding distance of downward movement of backrest 130 preferably is in a range of about 70-80 percent of the H-point height change (e.g., 0.7×0.8Y).

Frontal section 123 of bottom cushion 120 generally supports and stabilizes the knee joint 184 and lower leg 185 of occupant 102. In preferred embodiments, seat bottom cushion 120 moves from its normal horizontal orientation (FIG. 1) to its deployed angled orientation (FIG. 3) by rotating about pivot 174, which is joined to the top of a stable front support 126 and to front region 122 of seat bottom 120. As a result, the height of front region 122 above floor 114 remains substantially unchanged in the deployed seat configuration. In other words, rear region 124 moves lower during deployment while front region 122 remains at substantially the same height. As a result, even as occupant 102 shifts into a safe posture corresponding to the deployed seat configuration depicted in FIGS. 3 and 4, the safe posture allows occupant 102 to control the vehicle. The location of knee joint 184 relative to accelerator pedal 116 is substantially unchanged, so occupant 102 in the deployed seat configuration may still reach accelerator pedal 116 (or a brake pedal) with his foot 186. Thus, although torso 187 is disposed downwards and slightly rearwards from a normal traveling posture, occupant 102 is typically capable of maintaining vision and steering control.

Mechanisms for moving backrest cushion 130 rearwards and downwards from a normal backrest position into the deployed seat configuration depicted in FIGS. 3 and 4 are described in detail further below. Generally, backrest cushion 130 in the deployed backrest position is in a range of about from 2 cm to 23 cm rearward from its normal backrest position, more typically in a range of about from 4 cm to 15 cm rearward from its normal backrest position. Generally, backrest cushion 130 in the deployed backrest position is in a range of about from 2 cm to 23 cm closer to vehicle floor 114 than in its normal backrest position, more typically in a range of about from 4 cm to 15 cm downwards from its normal backrest position.

As safety seat 104 deploys from a normal traveling configuration to a deployed configuration contemporaneously with a vehicle crash, movement of seat bottom 120 into its deployed angled orientation tips occupant 102 slightly backwards, reducing backset 152. Concurrent movement of backrest 130 rearwards "opens up" space at the back of seat occupant 102, thereby facilitating shifting of seat occupant 102 from a normal traveling posture into a safe posture in accordance with the invention, as depicted in FIG. 3. The downward movement of backrest 130 facilitates the downward shift in of the occupant's center of gravity to a lower H-point 158A. The combination of downward and rearward movement of backrest 130 results in a faster shift of occupant 102 from a normal driving posture into a safe posture than if there were no such movement of backrest 130. This is important for automobile crashes in which the time elapsed between detection of an imminent crash in the first impact is sometimes only about 10 ms to 40 ms. In embodiments in which a safety seat 104 includes a 3-point seat belt 141, a belt rolling device 148 at the backrest shoulder assures that the shoulder portion of the belt "follows" the occupant downwards with backrest 130 during deployment, thereby avoiding undesired interaction of shoulder portion with the neck, throat and head of the occupant. Because deployment of backrest 130 rearwards and downwards opens up space for seat occupant 102, resistance to downward and rearward shifting of seat occupant is reduced, resulting in a corresponding reduction of load applied by seat belt 141 to occupant 102 during deployment.

As shown in FIG. 3, bottom 132 of backrest 130 and rear region 124 of seat bottom cushion 120 are not integrated or attached or contiguous when seat 104 is in a deployed configuration. Rather there is space between backrest 130 and rear region 124, typically several centimeters. The space between backrest bottom 132 and rear region 124 is generally in a range of about from 5 cm to 40 cm, more typically in a range of about from 10 cm to 30 cm.

As shown in FIGS. 3 and 4, the safety posture of occupant 102 in deployed safety seat 104 results in increased headspace 156A compared to headspace 156 in a normal traveling posture. Generally, headspace 156A is in a range of about from 8 cm to 35 cm larger than headspace 156 in a normal seat configuration. Also, backset distance 152A in the deployed configuration is substantially smaller than backset distance 152 in the normal configuration of FIG. 1. In some embodiments, backset distance 152A is decreased to less than 1 cm.

As depicted in FIGS. 3 and 4, pretensioner 146 has tightened pretensioner cable 147, resulting in shortening of seat belt 141. In addition, seatbelt 141, having belt rolling device (BRD) 148 proximate to the shoulder of occupant 102, actively impels occupant 102 downwards and rearwards into a safe posture.

Some preferred embodiments include an improved air bag (not shown) incorporated into a seat belt system and designed to deploy forward, away from the occupant (e.g., toward a vehicle dashboard), instead of toward the occupant.

Figure 5:
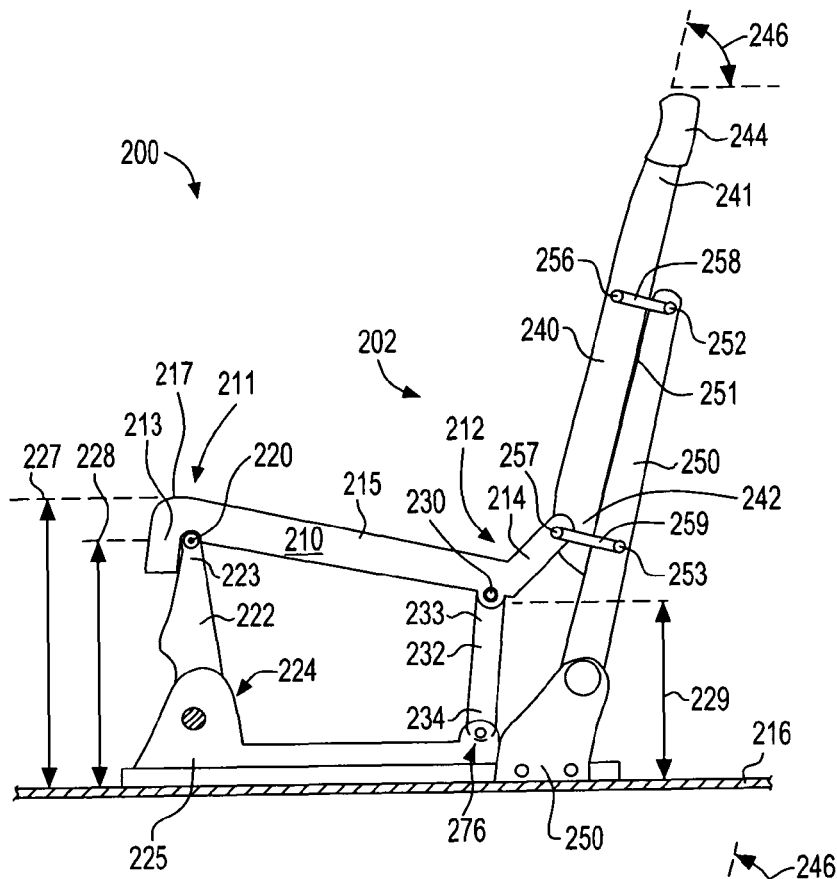
FIG. 5 depicts schematically a side view of a safety seat in accordance with the invention disposed in a normal configuration for normal traveling conditions.

FIG. 5 depicts schematically a side view 200 of a preferred embodiment of a vehicle safety seat 202 in accordance with the invention. Safety seat 202 in side view 200 is disposed in a normal configuration for normal traveling conditions. One of ordinary skill in the art will recognize that a seat 202 may be adapted for use in other types of vehicles, such as buses and trucks. Seat 202 includes seat bottom cushion 210 comprising a front region 211 and a rear region 212. Seat bottom cushion 210 includes a frontal section 213 located in front region 211, a rear section 214 located in rear region 212, and a middle section 215 located between frontal section 213 and rear section 214. In a normal horizontal orientation for normal traveling conditions, seat bottom cushion 210 is substantially parallel to vehicle floor 216. The top surface of middle section 215 defines a substantially horizontal top plane of bottom cushion 210 in a normal horizontal orientation. The top surface of bottom cushion 210 at front region 211 defines a front top surface 217. The top surface of bottom cushion 210 at rear region 212 defines a rear top surface.

Vehicle safety seat 202 comprises a front pivot 220 located at front region 211 of bottom cushion 210. Safety seat 202 further comprises front support 222 that supports bottom cushion 210. Front support 222 includes a front support upper end 223 and a front support lower end 224. Lower end 224 is connected to a seat adjustment assembly 225 interacting with a horizontal adjustment assembly (not shown) mounted to floor 216. Front support upper end 223 is pivotally connected to front region 211 at front pivot 220. As depicted in view 200 of FIG. 5, while seat bottom cushion 210 is in its normal horizontal orientation, frontal section 213 is substantially forward of front pivot 220 and extends downwards. In an exemplary embodiment in a passenger automobile in which seat cushion has a front-to-rear length of about 56 cm, frontal section 213 extends substantially downwards from middle section 215 a distance in a range of about from 5 cm to 18 cm when bottom cushion 210 is in a normal horizontal orientation. Rear section 214 slants upwards and rearwards from a substantially horizontal plane of seat bottom cushion 210 in a normal horizontal orientation. Generally, rear section 214 slants upwards and rearwards a distance in a range of about from 3 cm to 20 cm from the substantially horizontal plane of bottom cushion 210. Rear section 214 slants upwards and rearwards at an angle in a range of about from 20° to 90° from the substantially horizontal top plane of bottom cushion 210 in a normal horizontal orientation.

As is typical in conventional seats, some embodiments of a safety seat are adjustable by a seat height adjustment mechanism. The height of front top surface 217 above floor 216 in an exemplary embodiment is generally in a range of about from 37 cm to 47 cm, typically about 42 cm. The height of a corresponding front pivot 220 in an exemplary embodiment is in a range of about from 27 cm to 37 cm, typically about 32 cm, that is, approximately 10 cm lower than top surface 217, depending on cushion thickness. The height of corresponding rear top surface above floor 216 in an exemplary embodiment in normal configuration is in a range of about from 30 cm to 40 cm, typically about 35 cm, that is, about 7 cm lower than front top surface 217.

The height of frontal section 213, specifically the height of front top surface 217, above floor 216 is indicated by arrows 227. An exemplary height 227 in a passenger automobile is about 42 cm. The height of front pivot 220 above floor 216 is indicated by arrows 228. An exemplary height 228 of front pivot 220 in a passenger automobile is about 32 cm. The height of rear region 212 above floor 216 is indicated by arrows 229. An exemplary height 229 of rear region 212 in a passenger automobile is about 29 cm in a normal orientation.

Figure 6:
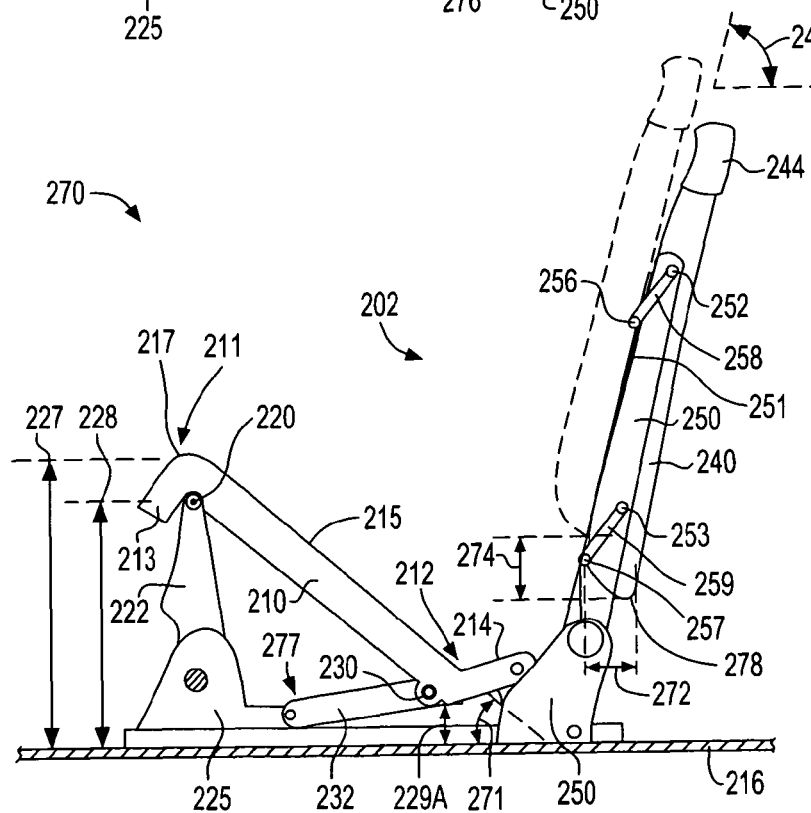
FIG. 6 depicts a side view of safety seat in a deployed configuration in accordance with the invention.

Seat 202 comprises a rear pivot 230 located at rear region 212 of seat bottom cushion 210. Seat 202 further comprises rear support 232 that supports seat bottom cushion 210 while seat bottom cushion 210 is in its normal horizontal orientation. Rear support 232 includes a rear support upper end 233 and a rear support lower end 234. Rear support upper end 233 is pivotally connected to rear region 212 at rear pivot 230. As described in detail below, rear support 232 is movable downwards. A downward movement of rear support 232 lowers rear region 212, causing bottom cushion 210 to rotate partially about front pivot 220 from a normal horizontal orientation to a deployed angled orientation (FIG. 6).

Seat 202 further comprises a substantially vertical backrest cushion 240 having an upper region 241 and a lower region 242. As depicted in FIG. 5, seat 202 preferably further comprises a head restraint cushion 244 located proximate to upper region 241 of backrest cushion 240. In some embodiments, head restraint cushion 244 is an extended portion of backrest cushion 240. In preferred embodiments, head restraint cushion 244 is separately adjustable and is assembled in seat 202 using techniques known in the art. In a normal backrest position as depicted in FIG. 5, backrest cushion 240 forms a backrest angle 246 with floor 216 that deviates slightly from vertical; for example, a backrest angle 246 departing from vertical in a range of about from 2° to 30°, more commonly in a range of about from 10° to 20°. Backrest cushion 240 is movable rearwards and downwards contemporaneously with a crash substantially instantly from a normal backrest position for normal traveling conditions to a deployed backrest position (FIG. 6).

Vehicle safety seat 202 further comprises a seat recliner 250 having a substantially vertical orientation. Seat recliner 250 is supported by a horizontal seat adjustment assembly mounted to floor 216. Seat 202 includes an upper recliner pivot 252 and a lower recliner pivot 253 integral with seat recliner 250. An upper backrest pivot 256 and a lower backrest pivot 257 are integral with backrest cushion 240. An upper hinge 258 pivotally connects backrest cushion 240 and seat recliner 250, upper hinge 258 being attached to upper backrest pivot 256 and to upper recliner pivot 252. Similarly, a lower hinge 259 on backrest cushion 240 pivotally connects backrest cushion 240 and seat recliner 250, lower hinge 259 being attached to lower backrest pivot 257 and to lower recliner pivot 253. Hinges 258, 259 are operable to pivot backrest cushion 240 rearwards and downwards toward said seat recliner 250. When backrest cushion 240 moves contemporaneously with a crash substantially instantly from a normal backrest position (FIG. 5) for normal traveling conditions to a deployed backrest position (FIG. 6), the location, dimensions and orientation of seat recliner 250 remain substantially unchanged. Some embodiments include only a single hinge and a corresponding single set of pivots to deploy backrest cushion 240 into a deployed position.

In some embodiments, particularly comprising a simple hinge mechanism as in safety seat 202, the rearward movement of backrest 240 is approximately equal to the downward movement. Some alternative embodiments (described below) are designed so that rearward movement of backrest 240 is substantially less than the downward movement.

FIG. 6 depicts schematically a side view 270 of safety seat 202 in a deployed configuration operable to shift a seat occupant into a safe posture in accordance with the invention. Seat bottom cushion 210 has moved from a horizontal orientation (FIG. 5) to a deployed angled orientation in which rear region 212 is substantially lower than rear region 212 in its normal orientation. Also, backrest cushion 240 has moved rearwards and downwards from a normal backrest position (see dashed outline) to a deployed backrest position. Generally, rear region 212 is lowered by lowering rear support 232. Mechanisms for lowering a rear support are described further below. The height of bottom cushion rear region 212 above floor 216 indicated by vertical distance 229A typically is at least about 10 cm lower than rear region 212 in its normal orientation (height 229 in FIG. 5), preferably in a range of about 13 cm to 40 cm lower, and more preferably in a range of about from 16 cm to 26 cm lower. Generally, rear region 212 is in a range of about from 10 cm to 30 cm lower than in its normal orientation. The height of the rear top surface of cushion 210 above floor 216 in a deployed angled orientation of an exemplary embodiment is in a range of about from 5 cm to 15 cm, depending on cushion thickness and vertical distance traveled from normal height to deployed height. In some embodiments, the bottom side of rear region 212 comes to rest on floor 216. In other embodiments, for example, in automobiles having a seat adjustment assembly 225, the bottom side of rear region 212 comes to rest several centimeters (e.g. 2-12 cm) above floor 216, as depicted by distance 229A in FIG. 6.

In a horizontal orientation for normal traveling as depicted in FIG. 5, seat bottom cushion 210 is typically adjusted into a slightly slanted orientation to maximize traveling comfort. In an exemplary horizontal orientation for normal traveling, rear region 212 of bottom cushion 210 is in a range of about from 2 cm to 6 cm lower than front region 211, and the approximately planar sitting surface of seat bottom cushion 210 forms an angle in a range of about from 2° (degrees) to 10° with the plane of floor 216. In a deployed angled orientation in accordance with the invention as depicted in FIG. 6, rear region 212 is typically at least about 12 cm lower than front region 211. Generally, in a deployed angled orientation, rear region 212 is in a range of about from 12 cm to 37 cm lower than in its normal horizontal orientation. Accordingly, in a deployed angled orientation, seat bottom cushion 210 forms an angle to vehicle floor 216 (indicated by arrows 271) generally in a range of about from 20° to 60°, preferably in a range of about from 25° to 50°, and more preferably in a range of about from 30° to 40°. Seat bottom 210 in deployed angled orientation inhibits forward movement of an occupant by forces of inertia. The height 227 of frontal section 213 and the height 228 of front pivot 220 above floor 216 remain substantially unchanged in deployed seat configuration. In other words, rear region 212 moves lower during deployment while front region 211 remains at substantially the same height. As a result, even as an occupant shifts into a safe posture corresponding to the deployed seat configuration depicted in FIG. 6, the occupant does not lose the ability control the vehicle.

Mechanisms for moving backrest cushion 240 rearwards and downwards from a normal backrest position into the deployed seat configuration depicted in FIG. 6 are described in detail further below. The total distance of rearward translation of backrest cushion 240 is represented by arrows 272 in FIG. 6. Generally, the total rearward movement 272 of backrest cushion 240 from its normal backrest position to a deployed backrest position is in a range of about from 2 cm to 18 cm rearwards, more typically in a range of about from 4 cm to 12 cm rearwards from its normal backrest position. The total distance of downward translation of backrest cushion 240 is represented by arrows 274 in FIG. 6. Generally, the total downward movement 274 of backrest cushion 240 from its normal backrest position to a deployed backrest position is in a range of about from 2 cm to 18 cm downwards, more typically in a range of about from 4 cm to 12 cm downwards from its normal backrest position. Frontal section 213 of seat bottom cushion 210 in a deployed angled orientation (FIG. 6) is not substantially higher or lower relative to vehicle floor 216 than middle section 215 in a substantially horizontal orientation for normal traveling (FIG. 5).

In some embodiments, seat bottom cushion 210 is deployed into a deployed angled orientation by moving rear support bottom 234 from a normal position 276 (FIG. 5) to a deployed position 277 (FIG. 6).

As shown in FIG. 6, bottom 278 of backrest 240 and rear section 214 of seat bottom cushion 210 are not integrated or attached or contiguous when seat 202 is in a deployed configuration. Rather there is space between backrest bottom 278 and rear section 214, generally in a range of about from 5 cm to 40 cm, more typically in a range of about from 10 cm to 30 cm.

Rear section 214 serves to support and to protect the posterior (including the spine) of a seat occupant when safety seat 202 is in a deployed configuration as in FIG. 6.

When backrest cushion 240 moves contemporaneously with a crash substantially instantly from a normal backrest position (FIG. 5) for normal traveling conditions to a deployed backrest position (FIG. 6), the location, dimensions and orientation of seat recliner 250 generally remain substantially unchanged. The backrest angle 246 that backrest 240 forms with floor 216 remains substantially unchanged between a normal backrest position and the corresponding deployed backrest position. In other words, typically, a deployed backrest position of backrest 240 is substantially parallel to its preceding normal backrest position. One skilled in the art, however, will understand that in some embodiments in accordance with the invention, the backrest angle that backrest 240 forms with floor 216 does not remain unchanged between a normal backrest position and the corresponding deployed backrest position because the deployed backrest is not parallel to the backrest in the preceding normal position.

As described in detail below, safety seat 202 typically comprises a seat bottom frame attached to or integral with said seat bottom cushion 210. An exemplary seat bottom frame has a frame front and a frame rear, the frame front being contiguous with front region 211 of bottom cushion 210, the frame rear being contiguous with rear region 212 of cushion 210. Generally, rear support upper end 233 is connected to the frame rear.

Similarly, safety seat 202 typically comprises a backrest frame attached to or integral with backrest cushion 240.

Preferred embodiments in accordance with the invention include an interconnected mechanism in which movement of backrest 240 is directly interconnected with movement of seat bottom 210. For example, as depicted in FIG. 5, rear section 214 of seat bottom 210 is detachably connected to backrest cushion 240 proximate to backrest lower pivot 257. In safety seat 202, deployment of bottom cushion 210 from a normal horizontal orientation to a deployed angled orientation releases a lock on backrest cushion 240, which allows backrest 240 to move downwards and rearwards into a deployed backrest position.

Safety seat 202 generally comprises a lock and release mechanism operable to hold stable lower end 234 of rear support 232 during normal traveling conditions and to translate lower end 234 contemporaneously with a vehicle crash from a lower end hold location 276 to a lower end deployed location 277, thereby lowering rear support 232 and rear region 212 of bottom cushion 210.

One of ordinary skill in the art will recognize that there are numerous other mechanisms suitable to transform a safety seat in accordance with the invention from a normal configuration to a deployed configuration.

Figure 27:
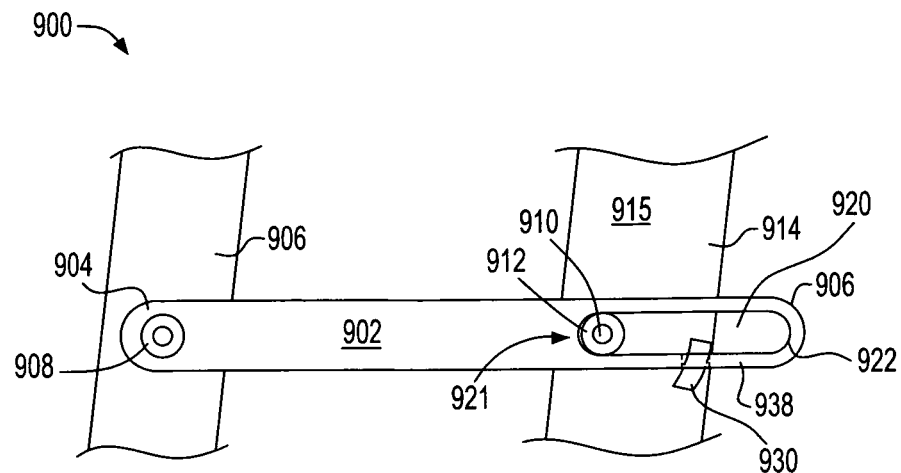
FIG. 27 depicts schematically a detailed view of an extendable hinge in a normal configuration for normal traveling conditions.

In some embodiments, a telescoping hinge or a slidably extendable hinge allows the distance traveled downwards by the backrest to be designed somewhat independently of the distance traveled rearwards. FIG. 27 depicts schematically a detailed view 900 of extendable hinge 902 in a normal configuration for normal traveling conditions. Hinge 902 has backrest end 904 and recliner end 906. Backrest end 904 is pivotally attached to backrest 906 at backrest pivot 908. A recliner pivot rod 910 having diameter 912 is embedded in recliner 914 and extends outward from side surface 915 of recliner 914. At its recliner end 906, hinge 902 comprises a slide slot 920 having a proximal end 921 and a distal end 922. Slide slot 920 has a selected slot length. Recliner end 906 is slidably coupled to recliner 914 by pivot rod 910, which engages slide slot 920. In a normal safety seat configuration, proximal slot end 921 is disposed proximate to pivot rod 910. A raised stopper 930 is embedded in recliner 914. Stopper 930 is located beneath slot wall 938 of hinge 902 between slot proximal end 921 and slot distal end 922. The top of stopper 930 rises slightly above the surface of recliner side surface 915 so that it engages a notch 936 (FIG. 28) in the bottom surface of slot wall 938. In a normal safety seat configuration, stopper 930 in notch 936 immobilizes hinge 902, preventing backrest 906 from sliding forward during normal traveling.

Figure 28:
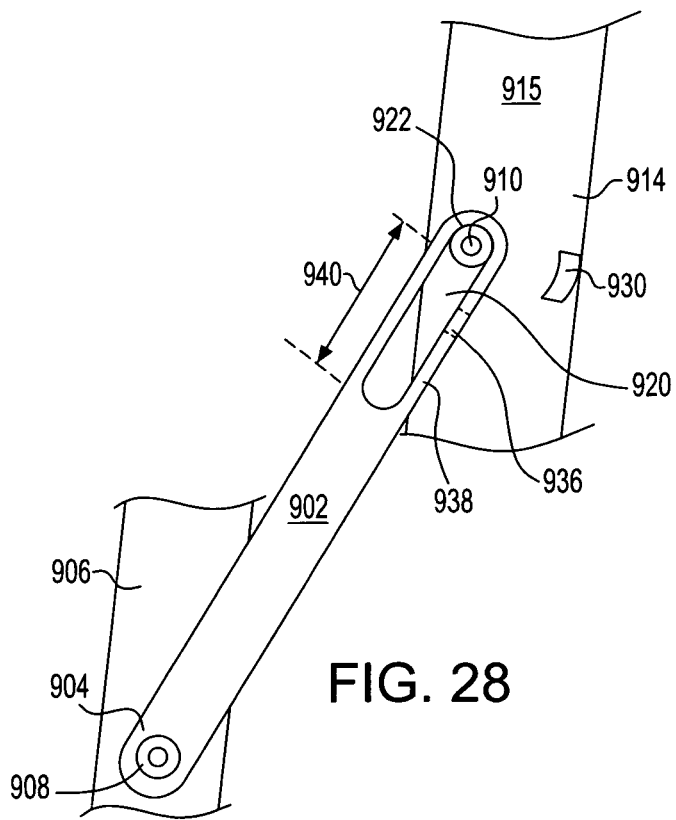
FIG. 28 depicts schematically a detailed view of an extendable hinge in a deployed configuration contemporaneous with a vehicle crash.

During deployment, backrest 906 moves downward, pivoting on hinge 902 about pivot rod 910. The accompanying rotation of hinge 902 causes recliner end 906 of hinge 902 to rotate upwards (counterclockwise in FIG. 27). This movement results in disengagement of stopper 930 and notch 936, which releases hinge 902 to slide downwards. As a result, as depicted in FIG. 28, hinge 902 slides downward guided by pivot rod 910 in slot 930 until distal end 922 is disposed at pivot rod 910. The effective length of hinge 902 is thereby increased by hinge extension distance 940, which corresponds to the length of slot 920 minus the diameter 912 of pivot rod 910. A second raised stopper, such as stopper 574 described with reference to FIG. 16, limits the rearward rotation of hinge 902 and thereby the rearward movement of backrest 906 during deployment. Thus, this assembly allows the distance traveled downwards by the backrest to be designed somewhat independently of the distance traveled rearwards by selection of the hinge extension distance 940 and the location of the second stopper (e.g., stopper 574). In an exemplary embodiment, the backrest moves downward a distance of 25 cm during deployment, while its rearward movement (measured horizontally) is 10 cm.

Figure 7:
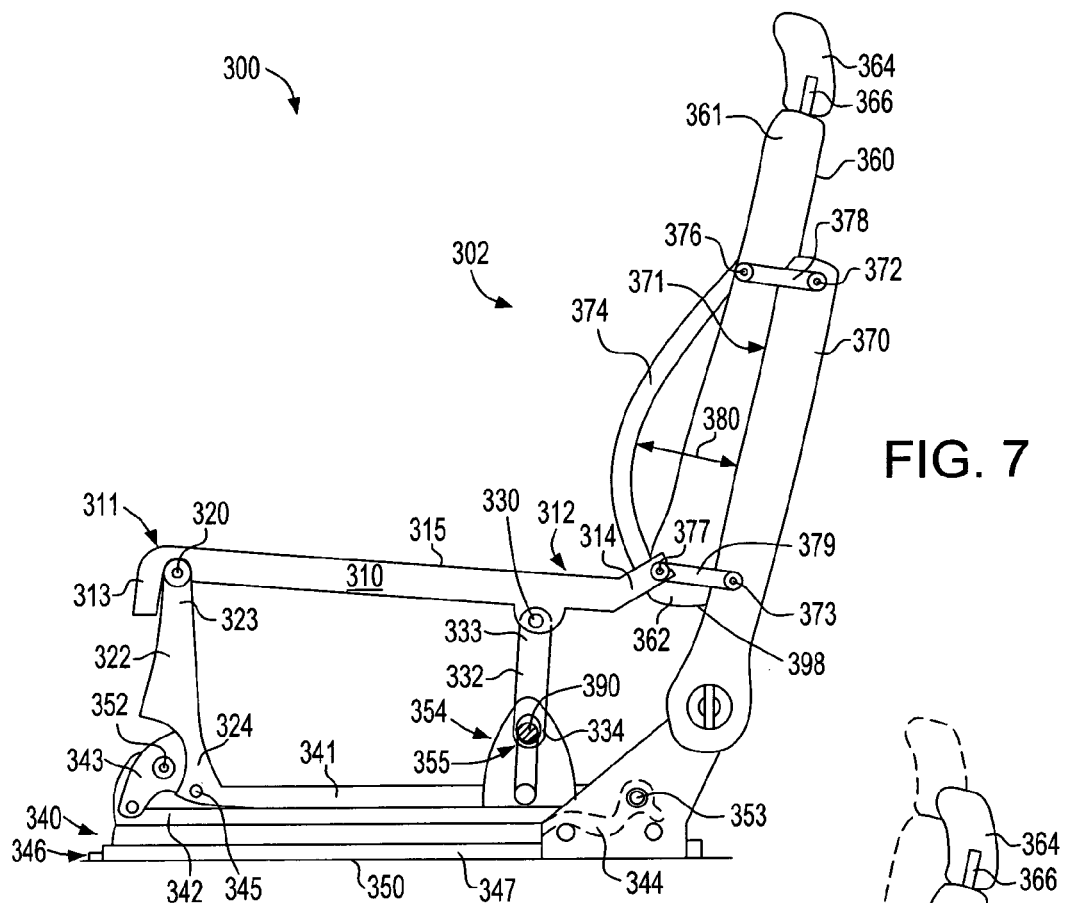
FIG. 7 depicts schematically a side view of a vehicle safety seat frame in accordance with the invention in a normal configuration for normal traveling conditions.
Figure 9:
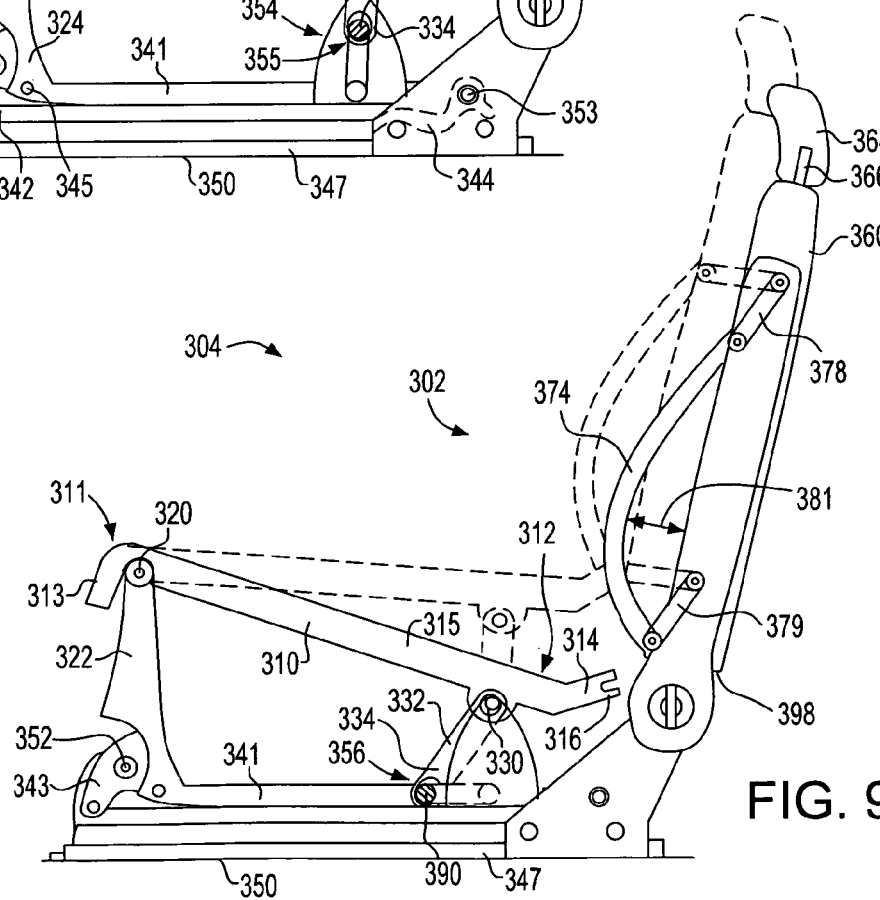
FIG. 9 depicts side view of the safety seat frame of FIG. 7 in a deployed configuration.
Figure 8:
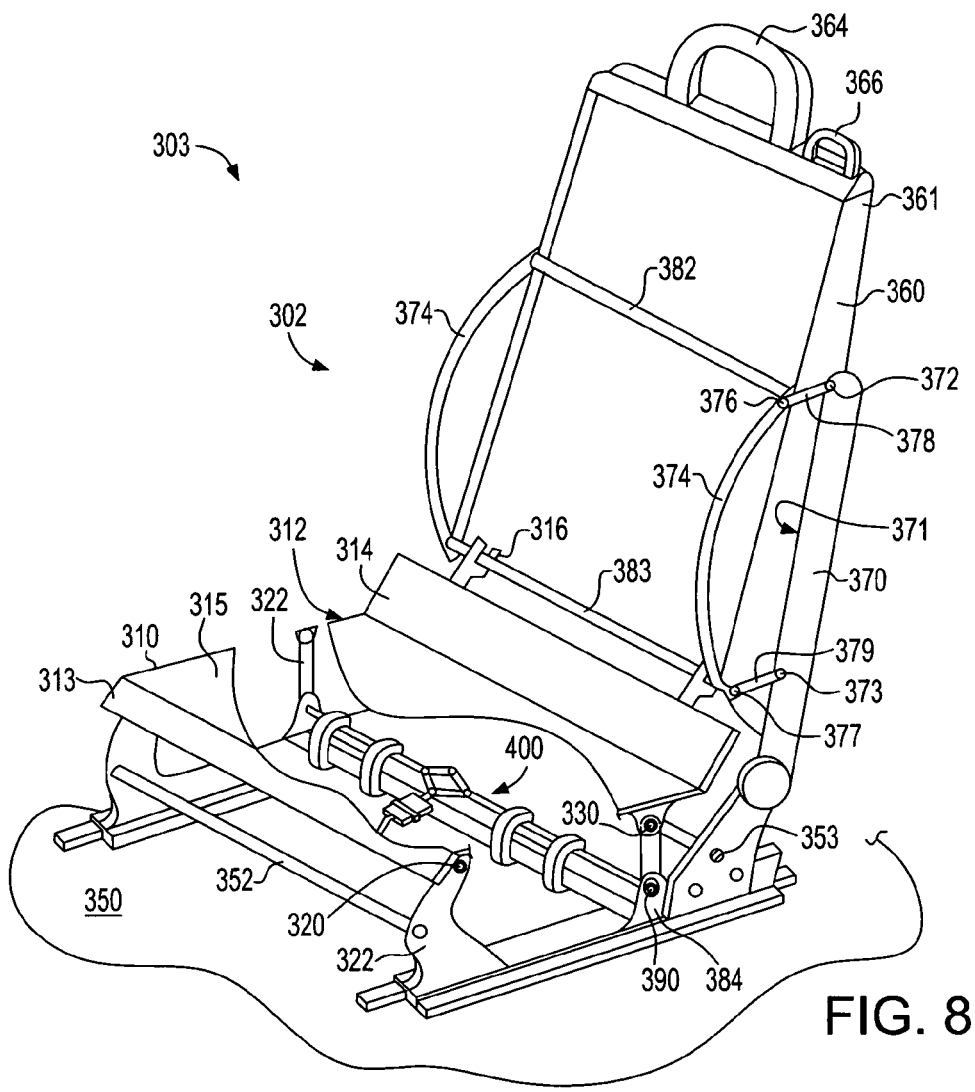
FIG. 8 depicts schematically a perspective view of the seat frame of FIG. 7.
Figure 10:
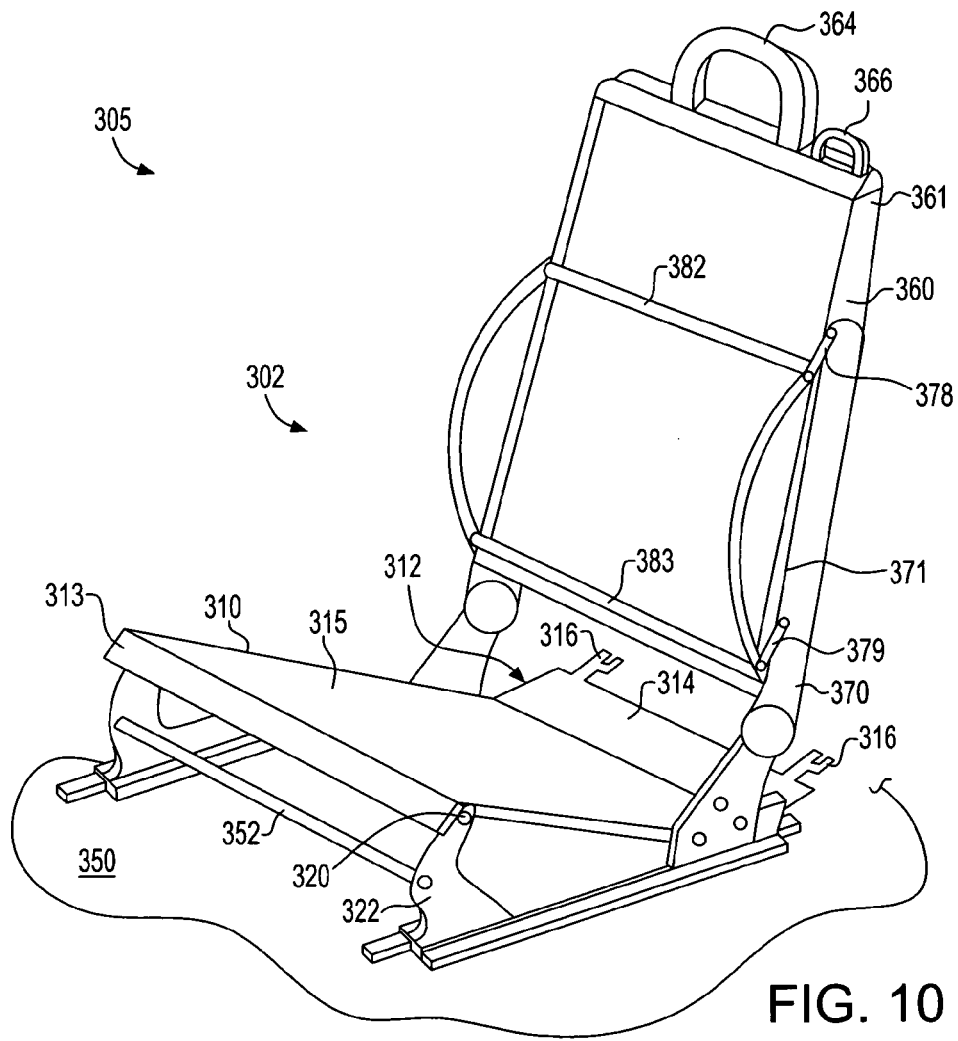
FIG. 10 depicts a perspective view of the seat frame of FIG. 9.

FIG. 7 depicts schematically a side view 300 of a preferred embodiment of a vehicle safety seat frame 302 of a vehicle safety seat in accordance with the invention in a normal configuration for normal traveling conditions. FIG. 8 depicts schematically a perspective view 303 of seat frame 302 in normal configuration. FIG. 9 depicts schematically a side view 304 of a preferred embodiment of safety seat frame 302 in a deployed configuration operable to shift a seat occupant into a safe posture in accordance with the invention. FIG. 10 depicts schematically a perspective view 305 of seat frame 302 in deployed configuration. One of ordinary skill in the art will recognize that a seat frame 302 may be adapted for use in other types of vehicles.

As depicted in FIGS. 7 and 8, seat frame 302 includes seat bottom frame 310 comprising a front region 311 and a rear region 312. In its normal horizontal orientation for normal traveling conditions, seat bottom frame 310 is substantially parallel to vehicle floor pan 350. Seat bottom frame 310 includes a frontal section 313 located in front region 311, a rear section 314 located in rear region 312, and a middle section 315 located between frontal section 313 and rear section 314. In an exemplary embodiment in a passenger automobile in which seat bottom frame 310 has a front-to-rear length of about 56 cm, frontal section 313 extends substantially downwards from middle section 315 a distance in a range of about from 5 cm to 18 cm when bottom frame 310 is in a normal horizontal orientation. Rear section 314 slants upward and rearward from the substantially horizontal plane of seat bottom frame 310 in a normal horizontal orientation. Generally, rear section 314 slants upward and rearward a distance in a range of about from 3 cm to 20 cm. Generally, rear section 314 slants upward and rearward at an angle in a range of about from 20° to 90° from the substantially horizontal top plane of bottom frame 310 in a normal horizontal orientation.

Seat frame 302 further comprises a C-shaped open hoop 316 (FIG. 8) fixedly attached to rear region 312 of seat bottom frame 310. As depicted in FIG. 8, while seat bottom frame 310 is in a normal horizontal orientation, open hoop 316 extends backwards from rear region 312. In some embodiments, open hoop 316 is integral with rear section 314 of seat bottom frame 310.

Seat frame 302 comprises a front pivot 320 located at front region 311 of seat bottom frame 310. Seat frame 302 further comprises front support 322 that supports seat bottom frame 310. Front support 322 includes a front support upper end 323 and a front support lower end 324. Front support upper end 323 is pivotally connected to front region 311 at front pivot 320. As depicted in view 300 of FIG. 7, while seat bottom frame 310 is in its normal horizontal orientation, frontal section 313 is substantially forward of front pivot 320 and extends downwards.

Seat frame 302 comprises a rear pivot 330 located at rear region 312 of seat bottom frame 310. Seat frame 302 further comprises rear support 332 that supports seat bottom frame 310 while seat bottom frame 310 is in its normal horizontal orientation. Rear support 332 includes a rear support upper end 333 and a rear support lower end 334. Rear support upper end 333 is pivotally connected to rear region 312 at rear pivot 330. As described below, rear support 332 is movable downwards. A downward movement of rear support 332 lowers rear region 312, causing seat bottom frame 310 to rotate partially about front pivot 320 from its normal substantially horizontal orientation to a deployed angled orientation (FIGS. 9-10).

Seat frame 302 further comprises a seat height adjustment mechanism 340 similar to those used in conventional vehicle seats. Seat height adjustment mechanism 340 comprises an upper member 341, a lower member 342, a front member 343 and a rear member 344. Front support lower end 324 is attached to front member 343 by a rivet 345 (or alternatively by some other means).

Seat frame 302 further comprises a horizontal adjustment mechanism 346. An exemplary horizontal adjustment mechanism 346 includes a sliding member 347 that slides in a slide track 348 mounted to floor pan 350. Seat height adjustment mechanism 340 is supported by horizontal adjustment mechanism 346 including front cross bar 352 and rear cross bar 353.

A lower lock and release mechanism 354 (described in more detail with reference to FIGS. 11-12) is operable to hold stable the lower end 334 of rear support 332 during normal traveling conditions and to translate lower end 334 contemporaneously with a vehicle crash from a lower end hold location 355 to a lower end deployed location 356 (FIG. 8), thereby lowering rear support 332 and rear region 312.

Seat frame 302 further comprises a substantially vertical backrest frame 360 having an upper region 361 and a lower region 362. As depicted in FIG. 7, seat frame 302 preferably further comprises a head restraint frame 364 located proximate to upper region 361 of backrest frame 360. In some embodiments, head restraint frame 364 is an extended portion of backrest frame 360. In preferred embodiments, head restraint frame 364 is separately adjustable and is assembled in seat frame 302 using techniques known in the art. Backrest frame 360 is movable rearwards and downwards contemporaneously with a crash substantially instantly from a normal backrest position for normal traveling conditions to a deployed backrest position (FIGS. 9-10). Generally, the total rearward movement of backrest frame 360 from its normal backrest position to a deployed backrest position is in a range of about from 2 cm to 18 cm rearwards, more typically in a range of about from 4 cm to 12 cm rearwards from its normal backrest position. Generally, the total downward movement of backrest frame 360 from its normal backrest position to a deployed backrest position is in a range of about from 2 cm to 26 cm downwards, more typically in a range of about from 4 cm to 16 cm downwards from its normal backrest position. Seat frame further includes a belt rolling device (BRD) 366 proximate to the shoulder of backrest 360. The presence of BRD 366 causes a seat belt to apply pressure on the shoulder and torso of a seat occupant during seat deployment, thereby actively impelling the occupant downwards and rearwards into a safe posture. BRD 366 also causes the shoulder sash portion of a seat belt to travel downwards with the backrest and occupant, thereby avoiding interference of the seat belt with the neck, throat and head of the occupant. In preferred embodiments, movement of backrest frame 360 from its normal position to its deployed position occurs simultaneously with deployment of seat bottom frame 310.

In a normal backrest position as depicted in FIG. 7, backrest frame 360 forms a backrest angle with floor pan 350 that deviates slightly from vertical; for example, a backrest angle in a range of about from 2° to 30° from vertical, more commonly in a range of about from 10° to 20° from vertical. Backrest 360 is movable rearwards and downwards contemporaneously with a crash substantially instantly from a normal backrest position for normal traveling conditions to a deployed backrest position (FIGS. 9-10). The backrest angle that backrest 360 forms with floor pan 350 remains substantially unchanged between a normal backrest position and the corresponding deployed backrest position. In other words, typically, a deployed backrest position of backrest 360 is substantially parallel to its preceding normal backrest position.

Vehicle safety seat frame 302 further comprises a seat recliner 370 having a substantially vertical orientation and having a front edge 371. Seat frame 302 includes on each side of recliner 370 an upper recliner pivot 372 and a lower recliner pivot 373 integral with seat recliner 370. Seat frame 302 further comprises a rigid linkage 374 integral with each side of backrest frame 360. Each rigid linkage 374 is disposed forward of said front edge 371 of said seat recliner 370. An upper backrest pivot 376 and a lower backrest pivot 377 are integral with each side of backrest 360. On each side of backrest 360, an upper hinge 378 pivotally connects rigid linkage 374 and seat recliner 370, upper hinge 378 being attached to rigid linkage 374 at upper backrest pivot 376, and upper hinge 378 being attached to seat recliner 370 at upper recliner pivot 372. Similarly, a lower hinge 379 on each side of backrest 360 pivotally connects rigid linkage 374 and seat recliner 370, lower hinge 379 being attached to rigid linkage 374 at lower backrest pivot 377, and lower hinge 379 being attached to seat recliner 370 at lower recliner pivot 373. Hinges 378, 379 are operable to pivot rigid linkage 374 rearwards and downwards toward said seat recliner 370. Rigid linkages 374 are movable contemporaneously with a crash substantially instantly from a normal linkage position for normal traveling conditions to a deployed linkage position (FIG. 9). Hinges 378, 379 are movable rearwards and downwards to a deployed hinge position, thereby causing a rearward and downward movement of backrest frame 360 from the normal backrest position to the deployed backrest position. In normal linkage position, a rigid linkage 374 forms a gap (represented by arrows 380 in FIG. 8) between rigid linkage 374 and seat recliner front edge 371. The gap is substantially decreased (see arrows 381 in FIG. 9) when rigid linkages 374 are in a deployed linkage position. Rigid linkages 374 significantly increase the strength of backrest frame 360.

Safety seat frame 302 further comprises an upper crossbar 382 and a lower crossbar 383 (FIG. 8) integral with backrest frame 360. As depicted in FIG. 8, in a normal configuration for normal traveling conditions, lower crossbar 383 is locked in place and supported by C-shaped open hoop 316.

FIG. 9 depicts schematically side view 303 of safety seat 302 in a deployed configuration operable to shift a seat occupant into a safe posture in accordance with the invention. Seat bottom frame 310 has moved from a horizontal orientation (FIG. 7) to a deployed angled orientation in which rear region 312 is substantially lower than rear region 312 in its normal orientation. Also, backrest frame 360 has moved rearwards and downwards from a normal backrest position (see dashed outline) to a deployed backrest position. Generally, rear region 312 is lowered by lowering rear support 332. Mechanisms for lowering a rear support are described further below. The height of bottom frame rear region 312 above floor pan 350 typically is at least about 10 cm lower than rear region 312 in its normal orientation, preferably in a range of about 15 cm to 40 cm lower, and more preferably in a range of about from 16 cm to 26 cm lower. Generally, rear region 312 is in a range of about from 10 cm to 30 cm lower than in its normal orientation. The height of rear region 312 above floor pan 350 in a deployed angled orientation of an exemplary embodiment is in a range of about from 0 cm to 15 cm, depending on seat dimensions and vehicle design and on the vertical distance traveled from normal height to deployed height.

In a horizontal orientation for normal traveling as depicted in FIG. 7, seat bottom frame 310 is typically adjusted into a slightly slanted orientation to maximize traveling comfort. In an exemplary horizontal orientation for normal traveling, rear region 312 of bottom frame 310 is in a range of about from 2 cm to 6 cm lower than front region 311, and the approximately planar top surface of seat bottom frame 310 (e.g., at middle section 315) forms an angle in a range of about from 2° (degrees) to 10° with the plane of floor pan 350. In a deployed angled orientation in accordance with the invention as depicted in FIG. 9, rear region 312 is typically at least about 12 cm lower than front region 211. Generally, in a deployed angled orientation, rear region 312 is in a range of about from 12 cm to 37 cm lower than in its normal horizontal orientation. Accordingly, in a deployed angled orientation, seat bottom frame 310 forms an angle to vehicle floor pan 350 generally in a range of about from 20° to 60°, preferably in a range of about from 25° to 50°, and more preferably in a range of about from 30° to 40°. Seat bottom 210 in deployed angled orientation inhibits forward movement of an occupant by forces of inertia. The height of frontal section 313 and the height of front pivot 320 above floor pan 350 remain substantially unchanged in deployed seat configuration. In other words, rear region 312 moves lower during deployment while front region 211 remains at substantially the same height. As a result, even as an occupant shifts into a safe posture corresponding to the deployed seat configuration depicted in FIG. 9, the occupant generally does not lose the ability to control the vehicle.

Figure 11:
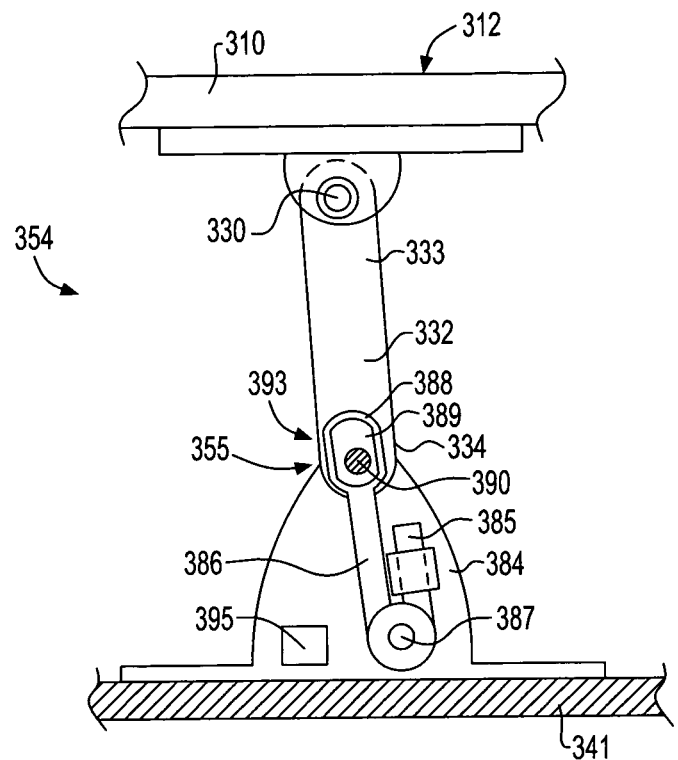
FIG. 11 contains a detailed view of a lower lock and release mechanism in a hold status for normal traveling conditions.

FIG. 11 contains a detailed view of lower lock and release mechanism 354 in a hold status for normal traveling conditions. A lower lock and release mechanism 354 is mounted on each side of seat frame 302, one mechanism 354 for each rear support 332. It is understood that in embodiments having only a single rear support, only one corresponding mechanism 354 is sufficient. Bracket 384 is mounted onto upper member 341 of seat height adjustment mechanism 340. A torsion spring 385 having translatable spring arm 386 is mounted to bracket 384. Spring arm 386 is pivotable about pivot 387. Spring arm 387 includes closed loop 388, which defines a guide channel 389. Closed loop 388 engages rising pin 390 located on lower end 334 of rear support 332, thereby coupling rear support lower end 334 to translatable spring arm 386. In a normal seat configuration, spring arm 386 in its normal position 393 is in a substantially upright orientation and lower end 334 is disposed at lower end hold location 355 for normal traveling conditions. A controllable movable shaft 392 functions similarly to a bolt in a sliding bolt latch. In lock status during normal traveling conditions, shaft 392 extends out of shaft passage 397 through bracket 384 into shaft socket 416 (described below with reference to FIGS. 13-14). In lock status, extended movable shaft 392 blocks movement of lower end 334 of rear support 332, thereby locking spring arm 386 in its normal position 393 and lower end 334 in a lower end hold location 355.

Figure 12:
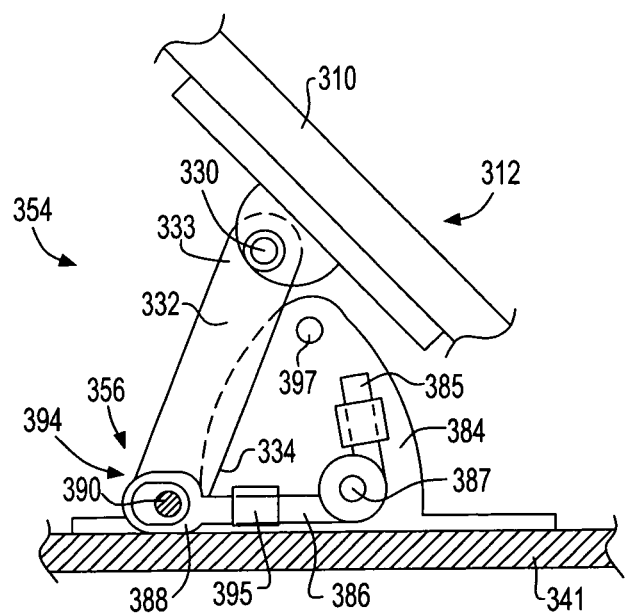
FIG. 12 contains a detailed view of the lower lock and release mechanism of FIG. 11 in release status for deployment of the seat frame contemporaneously with a crash.

FIG. 12 contains a detailed view of lower lock and release mechanism 354 in a release status for deployment of safety seat frame 302 contemporaneously with a vehicle crash. In release status, movable shaft 392 has been retracted (withdrawn) out of shaft socket 416 (FIGS. 13, 14), releasing rear support lower end 334. This allows spring arm 386 (or other biasing means) coupled to lower end 334 at rising pin 390 to move towards spring arm deployed location 394, thereby translating lower end 334 from lower end hold location 355 to a lower end deployed location 356. As a result, rear support 332 is lowered, causing rear region 312 to be lowered as seat bottom frame 310 pivots downward about front pivot 320. A dampening stopper 395 dampens the stroke of spring arm 386 as it completes deployment.

Figure 13:
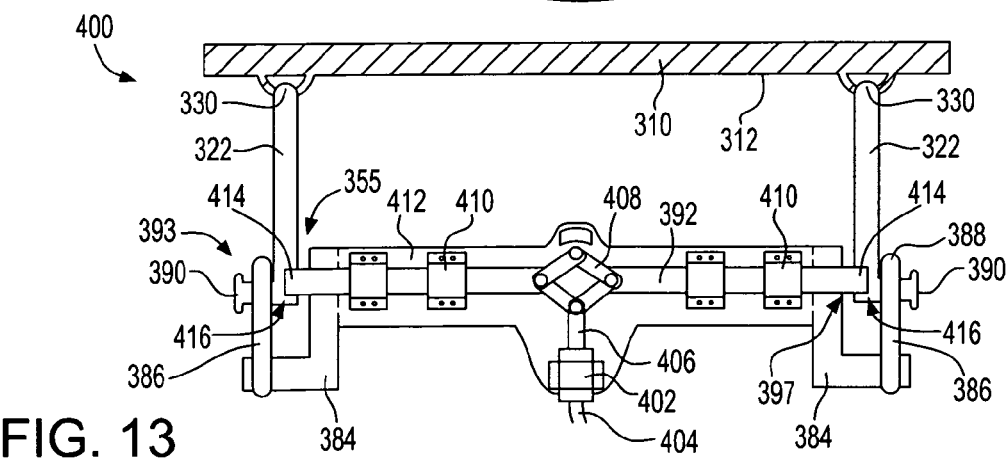
FIG. 13 depicts a front view of controllable lock and release device in a lock status.
Figure 14:
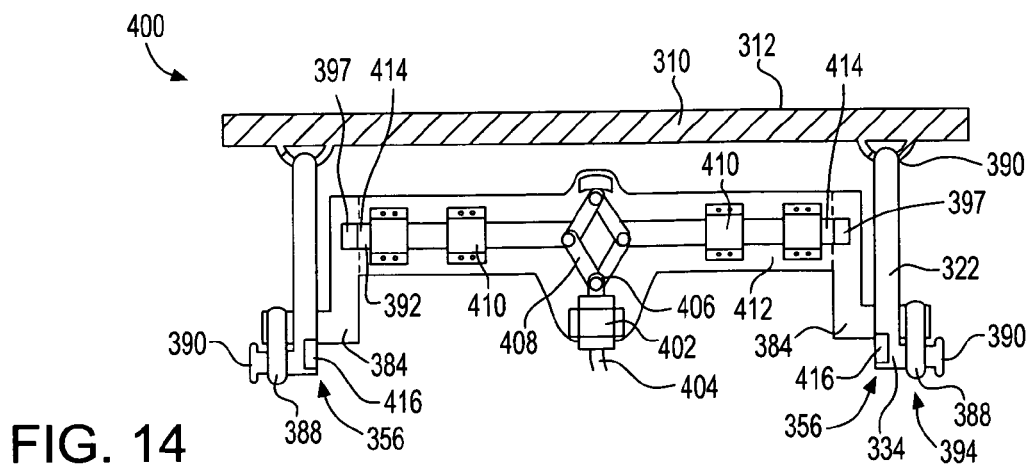
FIG. 14 depicts a front view of the controllable lock and release device of FIG. 13 in a release status.

FIG. 13 depicts schematically a controllable lock and release device 400 in a lock status. FIG. 14 depicts controllable lock and release device 400 in a release status. Lock and release device 400 comprises a push-pull solenoid 402 having electrical connector 404 and push-pull arm 406. Device 400 further includes controllable movable shaft 392 and jointed converter 408, which converts the push-pull movement of push-pull arm 406 into lateral movement of shaft 392. Device 400 further includes travel guides 410 through which movable shaft 392 moves laterally. Solenoid 402, converter 408, travel guides 410 and movable shaft 392 are mounted on assembly plate 412. Device 400 is disposed between brackets 384 proximate to floor 350 (FIG. 8). Lock and release device 400 is depicted in FIG. 8, located beneath seat bottom frame 310. In lock status, as depicted in FIG. 13, distal end 414 of movable shaft 392 extends through shaft passage 397 into shaft socket 416, thereby locking rear support 332, which holds translatable spring arm 386 in a substantially upright orientation for normal traveling conditions. Shaft socket 416 is disposed in lower end 334 of rear support 332 substantially concentric with rising pin 390 (although socket 416 need not be concentric with pin 390). In release status, as depicted in FIG. 14, in which distal end 414 of movable shaft 392 is retracted out of socket 416 back into shaft passage 397, lower end 334 of rear support 332 is released, which allows spring arm 386 (or other biasing means) to translate lower end 334 of rear support 332 from lower end hold location 355 to a lower end deployed location 356. As a result, rear region 312 and rear section 314 including open hoop 316 of seat bottom 310 move downwards towards floor pan 350 (FIG. 10). This movement occurs under the biasing force of torsion spring 385 and also under gravitational forces. This causes open hoop 316 to release lower crossbar 383 (FIG. 10). Gravity immediately forces backrest frame 362 to pivot rearwards and downwards on hinges 378, 379, as depicted in FIGS. 9-10. Thus, movable shaft 392 is a switchable blocker that blocks movement of spring arm 386 and rear support 332 when solenoid 402 is switched to push position and that allows movement of spring arm 386 and rear support 332 when solenoid 402 is switched into pull position. Solenoid 402 is controlled using a conventional electronic control unit, such as described below with reference to FIGS. 17-18. Preferred embodiments in accordance with the invention include a pre-crash detection (PDS) device, as described below with reference to FIG. 17-18.

Preferably, shaft passage 397 and shaft socket 416 comprise low-friction inside surfaces to decrease the retraction time of a retracting shaft 392.

Some embodiments of safety seat frame 302 comprise a slightly modified embodiment (not shown in the figures) of a lock and release mechanism in which movable shaft 392 extends out of a shaft passage through bracket 384 (to the left of spring arm 386 in FIG. 11), thereby locking rear support 332 and spring arm 386 in normal position 393. Upon retraction of shaft 392 into its shaft passage in bracket 384 in release status contemporaneous with a vehicle crash, spring arm 386 deploys to its deployed location 394, thereby translating lower end 334 from lower end hold location 355 to a lower end deployed location 356. In such embodiments, there is no shaft socket 416.

As shown in FIGS. 9-10, bottom 398 of backrest 370 and rear section 314 of seat bottom cushion 310 are not integrated or attached or contiguous when seat 302 is in a deployed configuration. Rather there is space between backrest bottom 398 and rear section 314, generally in a range of about from 5 cm to 40 cm, more typically in a range of about from 10 cm to 30 cm.

Figure 15:
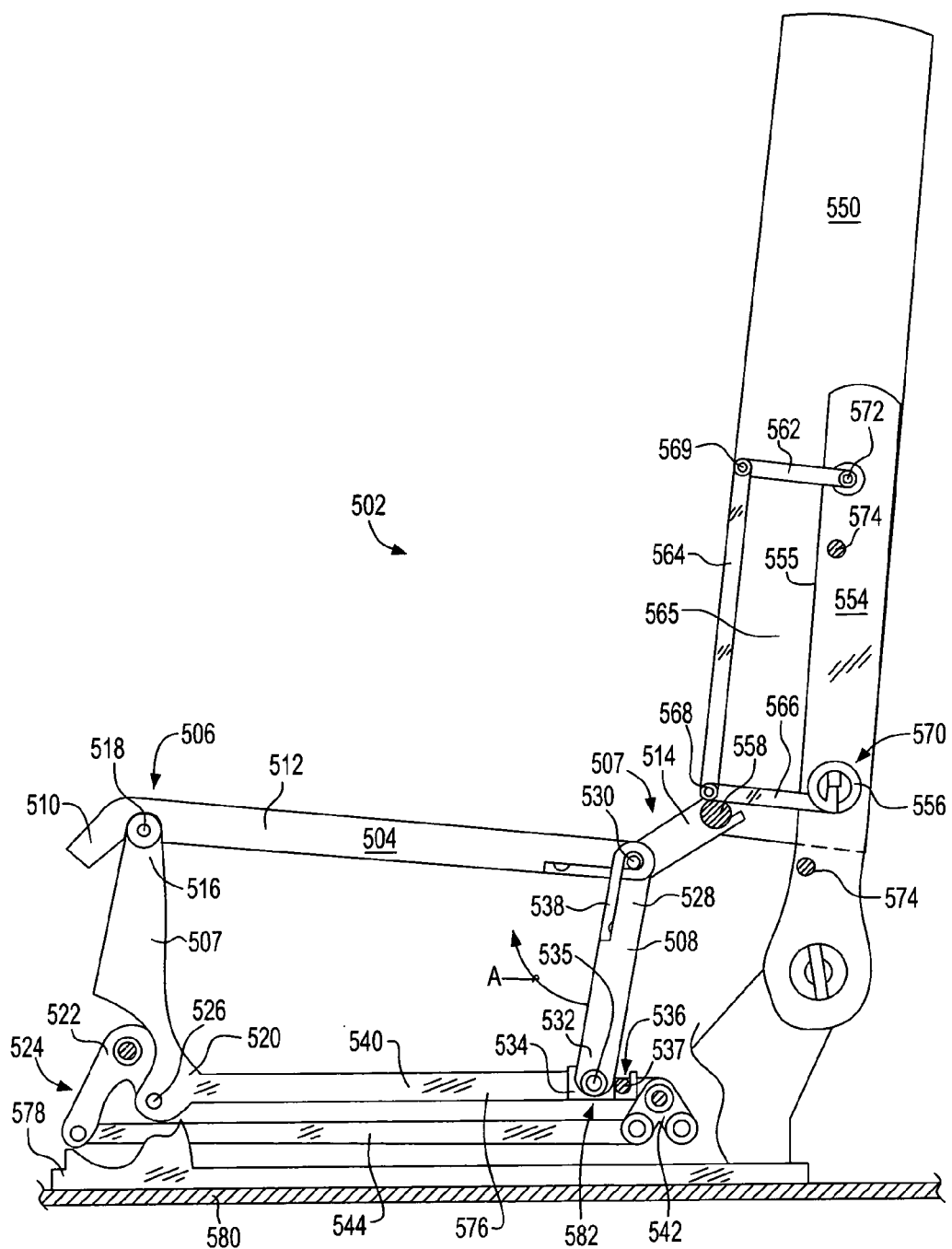
FIG. 15 depicts a side view of a vehicle safety seat frame in accordance with the invention in a normal configuration for normal traveling conditions.
Figure 16:
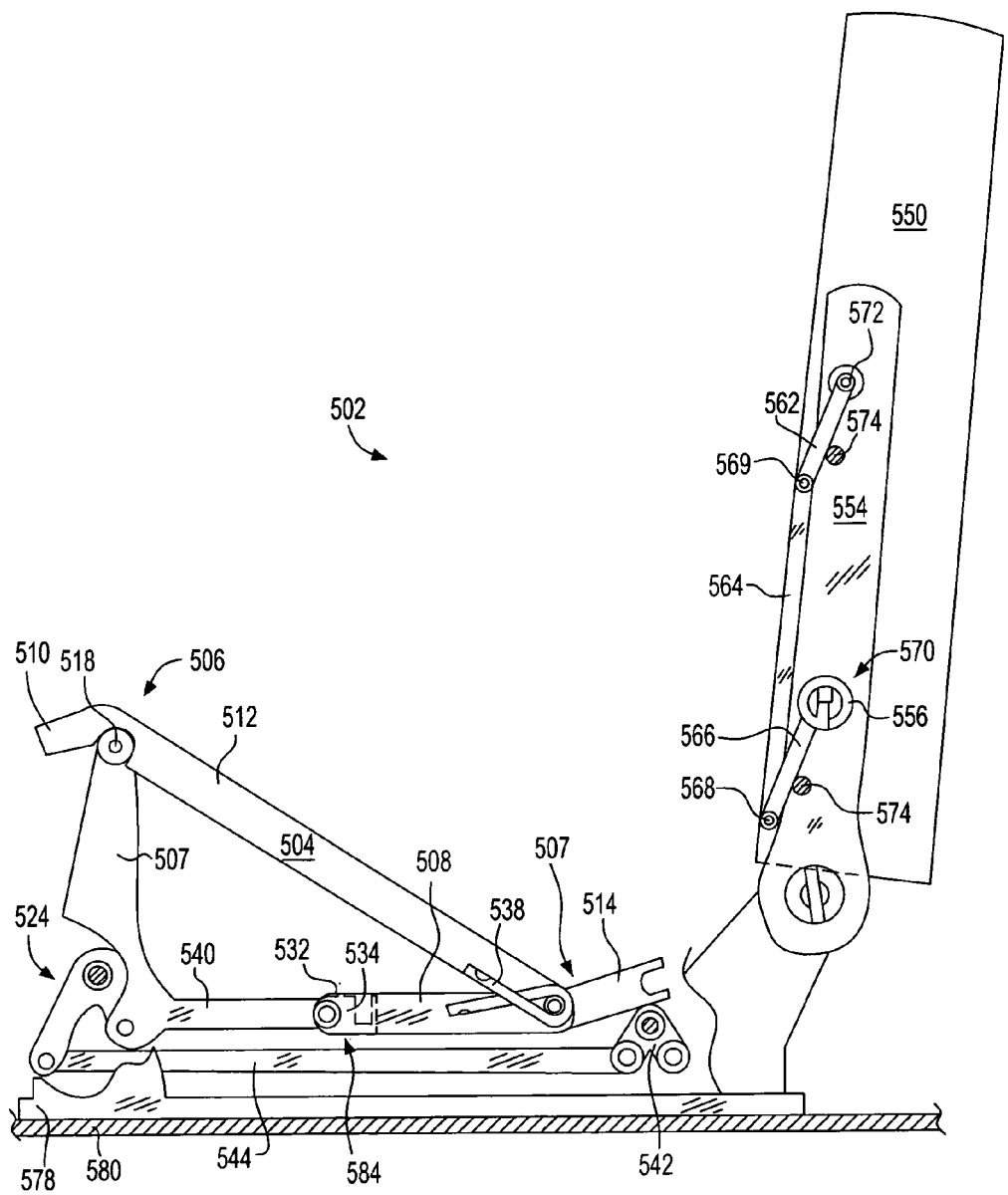
FIG. 16 depicts a side view of the seat frame of FIG. 15 in a deployed configuration.

FIG. 15 depicts schematically a side view of a vehicle safety seat frame 502 in accordance with the invention in a normal configuration for normal traveling conditions. FIG. 16 depicts schematically a side view of safety seat frame 502 in a deployed configuration operable to shift a seat occupant into a safe posture in accordance with the invention.

As depicted in view 500 in FIG. 15, seat frame 502 comprises a seat bottom frame 504 having a front 506 and a rear 507. Seat bottom frame 504 is supported by a pair of front legs 507 (front supports) and a pair of rear legs 508 (rear supports) (only one front leg and one rear leg shown). Seat bottom frame 504 comprises three sections: frontal section 510, middle section 512 and rear section 514. Seat bottom frame 504 is designed to enhance comfort and ergonomics during normal driving conditions, as well as to enhance safety when seat frame 502 is transformed geometrically to a supportive configuration when a collision is imminent.

The upper end 516 of front leg 507 is pivotally connected to seat bottom frontal section 510 by front pivot 518. The lower end 520 of front leg 507 is pivotally connected to front member 522 of seat height adjustment mechanism 524, typically by means of a rivet 526. The upper end 528 of rear leg 508 is pivotally attached to seat bottom 504 by rear pivot 530. The lower end 532 of rear leg 508 is pivotally attached to slider 534 by slider pivot 535. Slider 534 having a notch 536 is held in position by movable shaft 537. Movable shaft 537 serves as a latch bolt during normal driving conditions. A first torsion spring 538, or other biasing means, is mounted between seat bottom 504 and upper end 528 of rear leg 508. Alternative biasing means, such as an extension spring, is considered to be within the scope of the invention. First torsion spring 538 is mounted under tension to seat bottom 504. Movable shaft 537 restrains slider 534 against the biasing force of first torsion spring 538 in its tension condition. When slider 534 is released (by withdrawing movable shaft 537), biasing action of spring 538 causes rear leg 508 to pivot in the direction indicated by arrow A, as described below. Upper member 540 of seat height adjustment mechanism 524 serves additionally as a sliding rail equipped with a brass sleeve as an antifriction bearing surface. Upper member (sliding rail) 540 is horizontally connected to front member 522 and rear member 542 of seat height adjustment mechanism 524. Lower member 544 of seat height adjustment mechanism 524 is connected to a seat horizontal adjustment mechanism 578.

Vehicle safety seat frame 502 further comprises backrest frame 550. Backrest frame 550 includes a head restraint mounted thereto. Seat frame 502 also includes seat recliner 554 having a front edge 555, and further includes a second torsion spring 556 held in tension by rigid bar 558. A hinge 562 supports a rigid linkage 564 that is controlled by second torsion spring 556. A gap 565 is formed between rigid linkage 564 and front edge 555 when seat 502 is in a normal configuration. Movable shaft 537 restrains slider 534 against the biasing force of first torsion spring 538 in its tension condition. Rigid bar 558 holds leg 566 of second torsion spring 556 in tension. Location and movement of backrest frame 550 are controlled by rigid linkage 564, shown in the normal traveling position in FIG. 15. Rigid linkage 564 connects pivot end 568 of second torsion spring 556 with pivot end 569 of hinge 562. Pivot ends 568 and 569 are each pivotally connected to backrest frame 550. Second torsion spring 556 is attached to seat recliner 554 at lower recliner pivot 570. Hinge 562 is attached to seat recliner 554 at upper recliner pivot 572. A pair of external stoppers 574, 575 (one pair on each side of seat frame 502) is mounted to seat recliner 554 for cushioning deployment (FIG. 16) of backrest frame 550 contemporaneously with a vehicle crash. Generally, rigid linkage 564 is contained within a housing (not shown) to protect the movable assembly against dirt and corrosion.

Deployment of vehicle safety seat 502 from a normal configuration (FIG. 15) to a deployed configuration (FIG. 16) when a collision is imminent is triggered (initiated) by retraction of movable shaft (latch bolt) 536 (described in detail below with reference to FIGS. 17-18), resulting in release of slider 534. Upon release of slider 534, first torsion spring 538 causes rear leg 508 to rotate around pivot 530, pushing slider 534 over sliding rail portion 576 (FIG. 15) of upper member 540. The configuration of seat bottom frame 504 then transforms itself from a substantially horizontal orientation (FIG. 15) to a second angled position (FIG. 16) that supports the seat occupant against forward thrust.

FIG. 16 depicts backrest frame 550, seat recliner 554, second torsion spring 556, rigid bar 558 detachably connected to seat bottom 504, hinge 562 and rigid linkage 564 in deployed positions when a collision is imminent. When rigid bar 558 (see FIG. 15) is released by rear section 514 as first tension spring 538 shifts seat bottom 504 to the deployed orientation of FIG. 16, second torsion spring 556 is released. Second torsion spring 556 biases vertically positioned rigid linkage 564 downward, moving backrest frame 550 rearwards, driven through upper pivot point 569 and lower pivot point 568. Second torsion spring 556 interacts with rigid linkage 564 for synchronizing backrest frame 550 relative to the stable position of seat recliner 554. External stoppers 574, 575 limit and cushion backrest frame 550 during transition from the first to the second position. Gap 565 between rigid linkage 564 and front edge 555 is decreased when seat 502 transforms into a deployed configuration. The new orientation of seat bottom 504 along with the deployed position of backrest frame 550 and connected head restraint creates a relatively safe suspension system for an occupant, shifting him into a safe posture to withstand collision impact forces. Seat recliner 554 remains in its initial position before, during and after geometric transformation of the seat.

In a deployed configuration of seat frame 502 (FIG. 16) contemporaneous with a vehicle crash, middle section 512 of seat bottom 504 tends to immobilize an occupant's pelvis, thereby mitigating kinematics of critical regions of an occupant's body. In a deployed configuration of seat frame 502 (FIG. 16) contemporaneous with a vehicle crash, frontal section 510 of seat bottom 504 protects an occupant's legs. It is known in the art that a seat occupant's legs are one of the most frequently injured body parts in vehicle crashes. In a deployed orientation, frontal section 510 slightly shifts the lower legs towards the horizontal. This decreases downward pressure exerted on the knee joints, lower legs and feet by the occupant's body due to inertial forces, particularly in case of pitch. Additionally, the surface area of frontal section 510 provides friction that counteracts movement of an occupant due to inertia.

Figure 17:
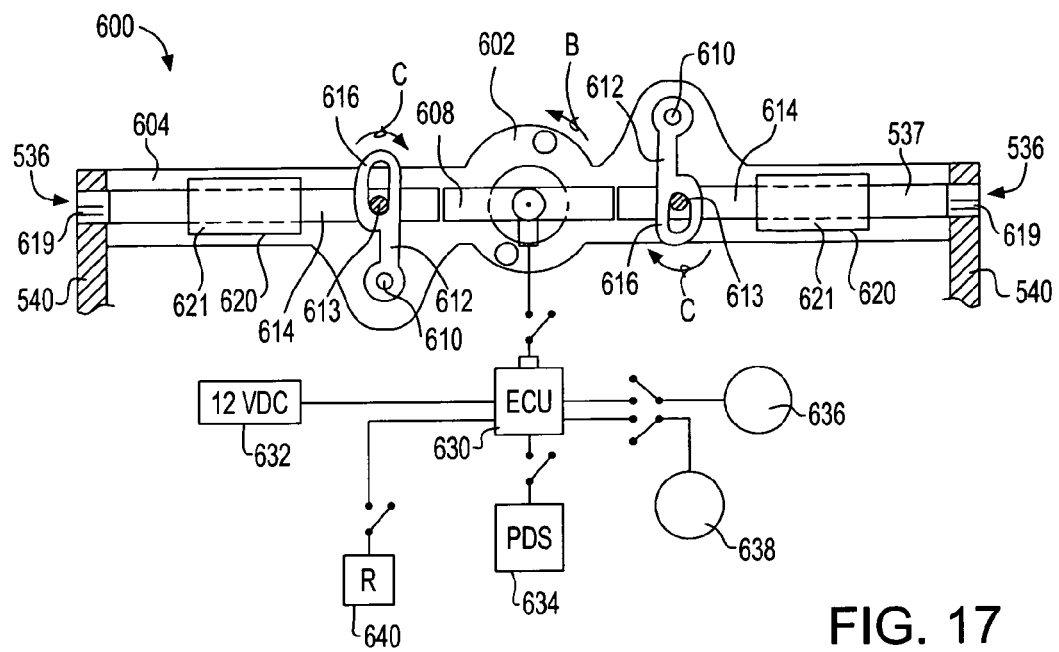
FIG. 17 depicts an exemplary controllable lock and release device in a lock status.
Figure 18:
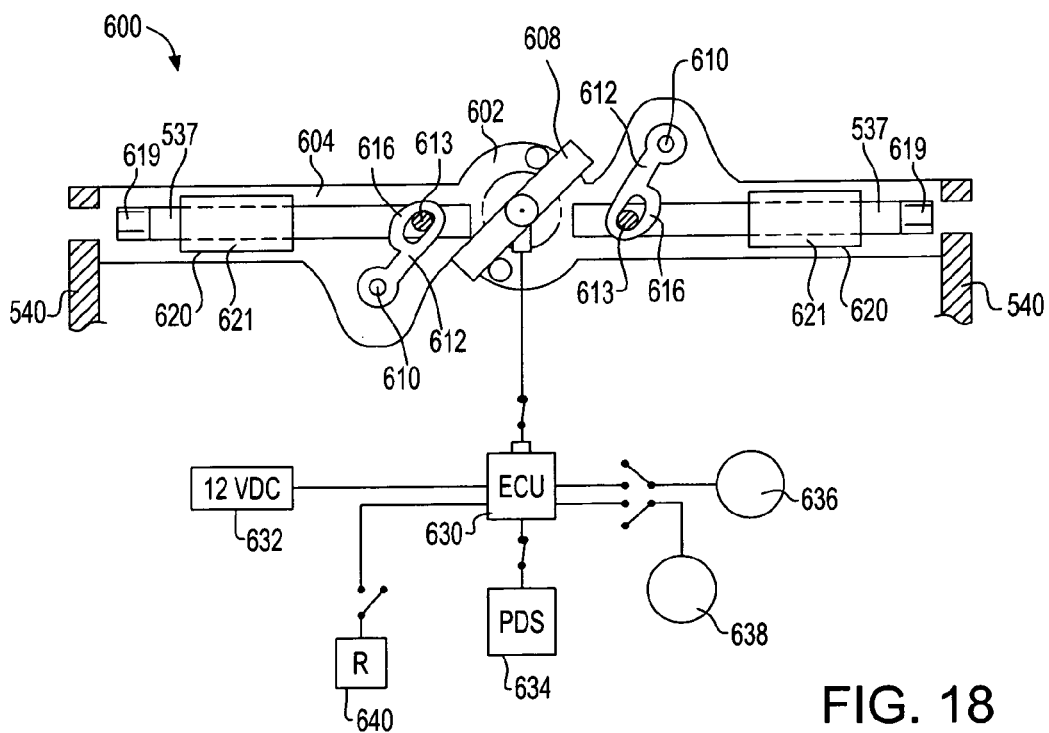
FIG. 18 depicts the lock and release device of FIG. 17 in a release status.

FIG. 17 depicts schematically an exemplary controllable lock and release device 600 in a lock status. FIG. 18 depicts controllable lock and release device 600 in a release status. Lock and release device is suitable for switching movable shaft 537 between a lock position (FIG. 15) and a release position (FIG. 16) in safety seat frame 502. A rotary solenoid 602 is mounted (e.g., with mounting studs (not shown)) to horizontally positioned plate 604. Plate 604 is connected to rear members 542 of vehicle seat height adjustment mechanism 524. Rotatable bar 608 interacts with a pair of torsion springs 610, each spring affixed to a corresponding rotatable link 612. Each movable shaft 537 comprises a raised pin 613 at its proximal end 614. Each link 612 has a guide loop 616 that engages respective raised pin 613. Both torsion springs 610 are held in normal position (for normal traveling conditions) by bar 608, so that distal ends 619 of movable shafts 537 are maintained in the extended position depicted in FIG. 15. In an extended position during normal traveling conditions, distal end 619 of a movable shaft 537 locks slider 534 in normal position, as depicted in FIG. 15.

Controllable lock and release device 600 further comprises an electronic control unit (ECU) 630 having a 12 V DC power supply 632. ECU energizes rotary solenoid 602 to switch solenoid 602 between a normal position (FIG. 17) and a deployed position (FIG. 18). A pre-collision detection system PDS device 634 (e.g., a radar in the millimeter wave length range) is operable to initiate deployment of mechatronic vehicle safety seat 502 when a collision is imminent by signaling ECU 630 to switch rotary solenoid 602 from a normal (lock) position to a deployed (release) position. Device 600 further comprises additional devices to generate a command signal to ECU 630. For example, a transducer 636, such as microphone, and an ergonomically placed pushbutton 638 are operable to generate a command signal to ECU 50 for instantly energizing rotary solenoid 602. A manual return switch 640 is operable to activate rotary solenoid 602 through a counter clockwise rotation and thereby to return links 612 to their initial (normal) zero-degree position.

As depicted in FIG. 18, when activated contemporaneously with a vehicle crash, rotary solenoid 602 rotates bar 608 counterclockwise in the direction indicated by arrow B. This action releases rotating links 612, to which torsion springs 610 (mounted in tension) apply clockwise (right hand) force in the direction indicated by arrows C. The rotary motions of links 612 is converted to linear motion of movable shafts 536. Movable shafts 537 are enclosed in a sleeve or channel 620 that is affixed to plate 604. Channel 620 has a metal bearing sleeve 621 to minimize friction forces between the interacting components. Slider rail portions 576 of upper members 540 (FIGS. 15, 16) each have an antifriction surface for reducing the deployment time of sliders 534.

Raised pin 613 affixed to each movable shaft 537 engages respective link 612. As links 612 rotate under bias from torsion springs 610, movable shafts 537 are retracted toward rotary solenoid 602 (FIG. 18). Low friction sleeves 621 enable movable shafts 537 to slide freely. Distal ends 619 of movable shafts 537 are pulled out laterally from notch 536 of sliders 534 (see FIG. 17), immediately releasing the forces of first torsion springs 538 (see FIGS. 15-16), which move slidable rear support legs 508 forward. As rear supports 508 slide forward, rear supports 508 deploy from their initial vertical orientation (FIG. 15) to a horizontal orientation (FIG. 16).

Some embodiments of a safety seat 502 (e.g., in automobiles) include a horizontal adjustment mechanism 578 mounted to vehicle floor 580. As depicted in FIGS. 15-16, seat height adjustment mechanism 524 is supported by horizontal adjustment mechanism 578.

Thus, a basic embodiment of a vehicle safety seat 502 in accordance with the invention comprises: a seat bottom frame 504 having a front 506 and a rear 507; a substantially vertical backrest frame 550; and a seat recliner 554 having a substantially vertical orientation and having a front edge 555. Seat bottom frame 504 is movable when a collision is imminent substantially instantly from a substantially horizontal orientation for normal conditions to a deployed angled orientation. In the deployed angled orientation, rear 507 of seat bottom frame 504 is substantially lower than rear 507 in a horizontal orientation for normal conditions. Also, in the deployed angled orientation, seat bottom rear 507 is substantially lower than seat bottom front 506. Backrest frame 550 is movable when a collision is imminent substantially instantly from a normal backrest position to a deployed backrest position. Backrest frame 550 is movable rearwards and downwards to the deployed backrest position. Backrest frame 550 in a normal backrest position defines a backrest angle relative to vehicle floor 580, and backrest frame 550 in the deployed backrest position defines an equal angle. In some embodiments, backrest frame 550 comprises a rigid linkage 564, which is disposed forward of front edge 555 of seat recliner 554, rigid linkage 564 forming a gap 565 between rigid linkage 564 and seat recliner 554 when backrest frame 550 is in the normal backrest position. Gap 565 is decreased when backrest frame 550 is in a deployed backrest position. In preferred embodiments, as depicted in FIGS. 15-16, seat bottom frame 504 comprises a frontal section 510, a middle section 512 and a rear section 514. Middle section 550 defines a horizontal plane substantially parallel to vehicle floor 580 in a normal horizontal orientation of seat bottom frame 504. Rear section 514 slants upward and rearward from the horizontal plane of middle section 550 in the normal horizontal orientation. Frontal section 510 extends substantially vertically downwards from the horizontal plane of middle section 550 in the normal horizontal orientation. Frontal section 510 extends substantially horizontally forwards from middle section 512 when seat bottom frame 504 is in a deployed angled orientation. Frontal section 510 of seat bottom frame 504 in the angled orientation is not higher or lower relative to vehicle floor 580 than middle section 512 of seat bottom frame 504 in a normal horizontal orientation. Some embodiments further comprise a head restraint associated with backrest frame 550. Some embodiments further comprise a pre-crash detection system 634 operable to activate deployment of safety seat 502. Preferably, vehicle safety seat 502 comprises a front pivot 518 at front 506 of seat bottom frame 504, seat bottom frame 504 being partially rotatable about front pivot 518. Some embodiments comprise vertical rear support 508 having rear support upper end 528 and rear support lower end 532. Upper end 528 is connected to rear 507 of seat bottom frame 504. Rear support 508 is movable downwards, which lowers rear 507 and causes seat bottom frame 504 to rotate partially about front pivot 518 from a horizontal orientation to a corresponding deployed angled orientation. Some embodiments further comprise a seat height adjustment mechanism 524. Seat bottom frame 504 in a horizontal orientation for normal conditions defines a normal seat bottom angle relative to vehicle floor 580. Seat height adjustment mechanism 524 is operable to adjust a normal seat bottom angle relative to vehicle floor 580 within a normal adjustment range to a maximum normal seat bottom angle relative to vehicle floor 580. Seat bottom frame 504 in the deployed angled orientation defines a deployed seat bottom angle relative to vehicle floor 580. The deployed seat bottom angle exceeds the maximum normal seat bottom angle. Seat height adjustment mechanism 524 comprises an upper member 540. In some embodiments, the lowest part of seat bottom frame 504 in a deployed angled orientation is not higher than upper member 540. In some embodiments, a vehicle safety seat backrest mechanism comprises: a backrest pivot 569 integral with rigid linkage 564; a recliner pivot 572 integral with seat recliner 554; and a hinge 562 pivotally connecting rigid linkage 564 and seat recliner 554. Hinge 562 is attached to rigid linkage 564 at backrest pivot 569, hinge 562 is attached to seat recliner 554 at recliner pivot 572. Hinge 562 facilitates a controlled deployment of rigid linkage 564 rearwards and downwards toward seat recliner 554. In some embodiments, front edge 555 of seat recliner 554 defines a recliner angle equal to the backrest angle. Preferably, seat recliner 554 has a position and an orientation that remain unchanged when backrest frame 550 is moved from a normal backrest position to a corresponding deployed backrest position. In some embodiments, backrest frame 550 includes a head restraint. Generally, vehicle safety seat 502 comprises: means for moving seat bottom frame 504 from a horizontal orientation into the deployed angled orientation; and means for moving backrest frame 550 from a normal backrest position to a corresponding deployed backrest position simultaneously with movement of seat bottom frame 504 from a horizontal orientation into the deployed angled orientation.

A basic embodiment of a method in accordance with the invention transforms the geometry of safety seat 502 to protect a seat occupant when a collision is imminent. A basic embodiment comprises steps of: moving seat bottom frame 504 substantially instantly when a collision is imminent from a substantially horizontal orientation to a deployed angled orientation in which rear 507 of seat bottom frame 504 is substantially lower than front 506 of seat bottom frame 504; and moving substantially instantly before the imminent collision a substantially vertical backrest 550 from a normal backrest position to a deployed backrest position by moving backrest frame 550 rearwards and downwards to a deployed backrest position. In some embodiments, moving backrest frame 550 from the normal backrest position rearwards and downwards to the deployed backrest position substantially decreases gap 565. Preferably, moving seat bottom frame 504 and moving backrest frame 550 are performed substantially simultaneously. In some embodiments, moving seat bottom frame 504 comprises partially rotating seat bottom frame 504 about front pivot 518 located at front 506 of seat bottom frame 504. In some embodiments, moving seat bottom frame 504 comprises lowering rear support 508 connected to rear 507 of seat bottom frame 504, thereby lowering rear 507 and causing seat bottom frame 504 to rotate partially about front pivot 518 located at the front. In some embodiments, lowering rear support 508 causes lowering rear 507 of seat bottom frame 504 to a height at least as low as upper member 540 of a seat height adjustment mechanism 524. In some embodiments, moving backrest frame 550 comprises pivoting backrest frame 550 on hinge 562 that connects rigid linkage 564 of backrest frame 550 to seat recliner 554. Preferably, moving backrest frame 550 from the normal backrest position to the deployed backrest position does not change a position and an orientation of seat recliner 554.

A version of a basic embodiment of a vehicle safety seat comprises: seat bottom frame 504 having front 506 and rear 507; substantially vertical front support 507 having front support upper end 516 and front support lower end 520; and substantially vertical rear support 508 having rear support upper end 528 and rear support lower end 532. Front support upper end 516 is pivotally connected at front pivot 518 to front 506 of seat bottom frame 504. By lowering rear 507, seat bottom frame 504 is rotatable about front pivot 518 from a substantially horizontal orientation for normal conditions to a deployed angled orientation when a collision is imminent. Rear support upper end 528 is pivotally connected to rear 507 at rear pivot 530. Rear support 508 is movable from a substantially vertical position to a substantially horizontal position by pivoting at rear pivot 530, thereby lowering rear 507. In some embodiments, seat bottom frame 504 comprises frontal section 510, middle section 512 and rear section 514. Front support upper end 516 is pivotally connected at front pivot 518 to frontal section 510 of seat bottom frame 504. By lowering rear section 514, seat bottom frame 504 is rotatable about front pivot 518 from a substantially horizontal orientation for normal conditions to a deployed angled orientation when a collision is imminent. Rear support upper end 528 is pivotally connected to rear section 514 at rear pivot 530. Rear support 508 is movable from a substantially vertical position to a substantially horizontal position by pivoting at rear pivot 530, thereby lowering rear section 514, causing seat bottom frame to move from its substantially horizontal orientation for normal conditions to a deployed angled orientation when a collision is imminent. In some embodiments, safety seat 502 further comprises: sliding rail 576 disposed beneath seat bottom frame 504; a slider 534 that is slidably connected to sliding rail 576; and a slider pivot 535. Rear support lower end 532 is pivotally attached to slider 534 at slider pivot 535. Slider 534 is located at a normal slider position 582 during normal conditions, and the slider is operable to slide to a deployed slider position 584 when a collision is imminent, thereby moving rear support lower end 532, which is pivotally attached to slider pivot 535. This causes rear support 508 to move from the substantially vertical position to the substantially horizontal position by pivoting at rear pivot 530. Some embodiments further comprise: seat height adjustment mechanism 524 comprising front member 522, upper member 540, lower member 544 and rear member 542. Sliding rail portion 576 of upper member 540 serves as sliding rail 576. Front support lower end 520 is rigidly attached to front member 522 of seat height adjustment mechanism 524. In some embodiments, when seat bottom frame 504 is in the deployed angled orientation, rear pivot 530 is not higher than upper member 540 of seat height adjustment mechanism 524. Some embodiments further comprise: a latch notch 536 in slider 534, movable shaft 537 and a biasing means. Latch notch 536 and movable shaft 537 are operable in a lock status to hold slider 534 at normal slider position 582 during normal conditions. In release status, when movable shaft 537 is withdrawn from notch 536, slider 534 is allowed to move to the deployed slider position 584 when a collision is imminent. In release status, the biasing means, for example, torsion spring 538, moves slider 534 to the deployed slider position 584 when a collision is imminent. Some embodiments further comprise: substantially vertical backrest frame 550, which is movable from a normal backrest position rearwards and downwards to a deployed backrest position when a collision is imminent. Backrest frame 550 in a normal backrest position defines a backrest angle relative to vehicle floor 580, and backrest frame 550 in a corresponding deployed backrest position defines a substantially equal backrest angle. Some embodiments further comprise a head restraint mounted on backrest frame 550. Some embodiments comprise: seat recliner 554 and rigid linkage 564. Seat recliner 554 has a substantially vertical orientation and a front edge 555. Front edge 555 defines a recliner angle substantially equal to the backrest angle. Rigid linkage 564 is integral with backrest frame 550 and is disposed forward of front edge 555 of seat recliner 554. Rigid linkage 564 forms a gap between rigid linkage 564 and seat recliner 554 when backrest frame 550 is in a normal backrest position, the gap being decreased when backrest frame 550 is in corresponding deployed backrest position. Some embodiments further comprise a backrest biasing means for urging rigid linkage 564 from a normal position rearwards and downwards to a deployed position when a collision is imminent, thereby moving backrest frame 550 from the normal backrest position to the deployed backrest position substantially simultaneously with movement of seat bottom frame 504 from the substantially horizontal orientation into the deployed angled orientation. Preferably, seat recliner 554 has a position and an orientation that remain substantially unchanged when backrest frame 550 is moved from a normal backrest position to a corresponding deployed backrest position.

Example 1

A comparative sled test was conducted to compare the performance of a vehicle seat modified in accordance with the invention with the performance of a conventional (unmodified) automobile "stock" seat.

The seat-versus-seat (SVS) sled test was conducted at a test laboratory certified by the American Association for Laboratory Accreditation (A2LA). The test was performed substantially in accordance with Federal Motor Vehicle Safety Standard (FMVSS) 208 of the United States Department of Transportation. Comparative data was collected from a frontal sled test characterized by 90° frontal impact, pulse corridor of 16-18 G (g-force), and overall velocity change of 35 mph. To minimize differences between the sled test and a barrier crash test, the sled test was conducted with 10 cm pitch displacement.

Two identical commercially available automobile seats were procured. The seats were the same as those installed in coupe-class models produced by a top well-known auto maker. Both seats were installed on the same sled platform and tested simultaneously under the same test conditions.

One of the conventional automobile seats, the "stock seat", remained unmodified and its geometry and orientations were not changed during testing.

The other seat (the "safety seat") was modified to be geometrically transformable into a deployed configuration in which the safety seat bottom was moved from a normal horizontal orientation to a deployed angled orientation in accordance with the invention. The position of the backrest of the safety seat was not modified during testing.

Identical calibrated dummies, that is, a 50th-percentile adult male anthropomorphic test device (ATD), occupied each of the test safety seat and the stock seat. Each dummy was belted with a 3-point seatbelt integrated with the seat and having a belt rolling device (BRD) located on the left shoulder of the backrest. No airbags were involved. The entire test was computer controlled and monitored. Measurements were recorded for 300 milliseconds (300 ms) after the sled pulse.

Bottom, backrest, and head restraint cushions, as well as overall seat geometry and dimensions, of both seats were initially identical, that is, until the safety seat transformed during the test to a deployed configuration in accordance with the invention. For the sake of clarity, some of the test safety seat's elements are designated here using the reference numerals used in FIGS. 5-6. At the start of the test ("normal configuration"), the top of the front edge of each seat's bottom cushion was about 41 cm (16 inches) above the test sled deck, and the top surface of the rear region of the cushions was about 33 cm (13 inches) above the sled deck. After deployment of the safety seat during the test, the top surface of the rear region of the safety seat bottom cushion was about 10 cm (4 inches) above the sled deck. In other words, the change in height of the rear region of the safety seat bottom was about 23 cm (9 inches). The height of the front region of the safety seat bottom remained at about 41 cm. The backrest of both stock seat and safety seat was not moved in the test.

Test results show that the dummy occupying test safety seat was subjected to considerably less accelerations, loads and moments to all regions of the body than the dummy in the stock seat.

Figure 19:
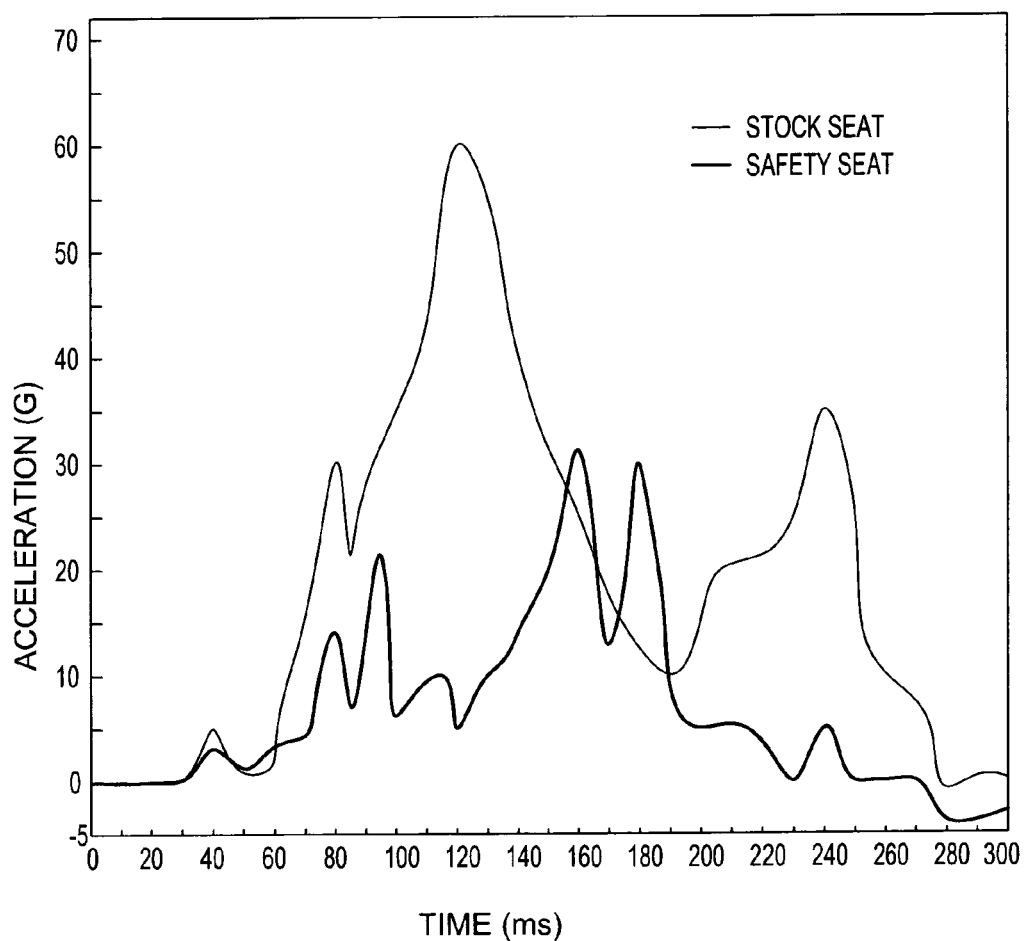
FIG. 19 contains a graph in which head acceleration (g-force) measurements on a safety seat dummy and a stock seat dummy are plotted as a function of time after sled pulse.

FIG. 19 contains a graph in which head acceleration (g-force) measurements on the safety seat dummy and the stock seat dummy are plotted as a function of time after initial sled pulse. The null reference time, t=0, is the instant at which the sled pulse was initiated. The maximum head acceleration of the dummy in the test safety seat was 32 G at 160 ms after sled pulse during the forward phase of the head trajectory. In the rebound phase, head acceleration was about 0 G at 240 ms after sled pulse. In contrast, the maximum head acceleration of the dummy occupying the stock seat was 60 G at 120 ms after sled pulse, during the forward phase of head trajectory. In the rebound phase, head acceleration of the stock seat dummy still reached about 32 G at 240 ms after sled pulse.

Figure 20:
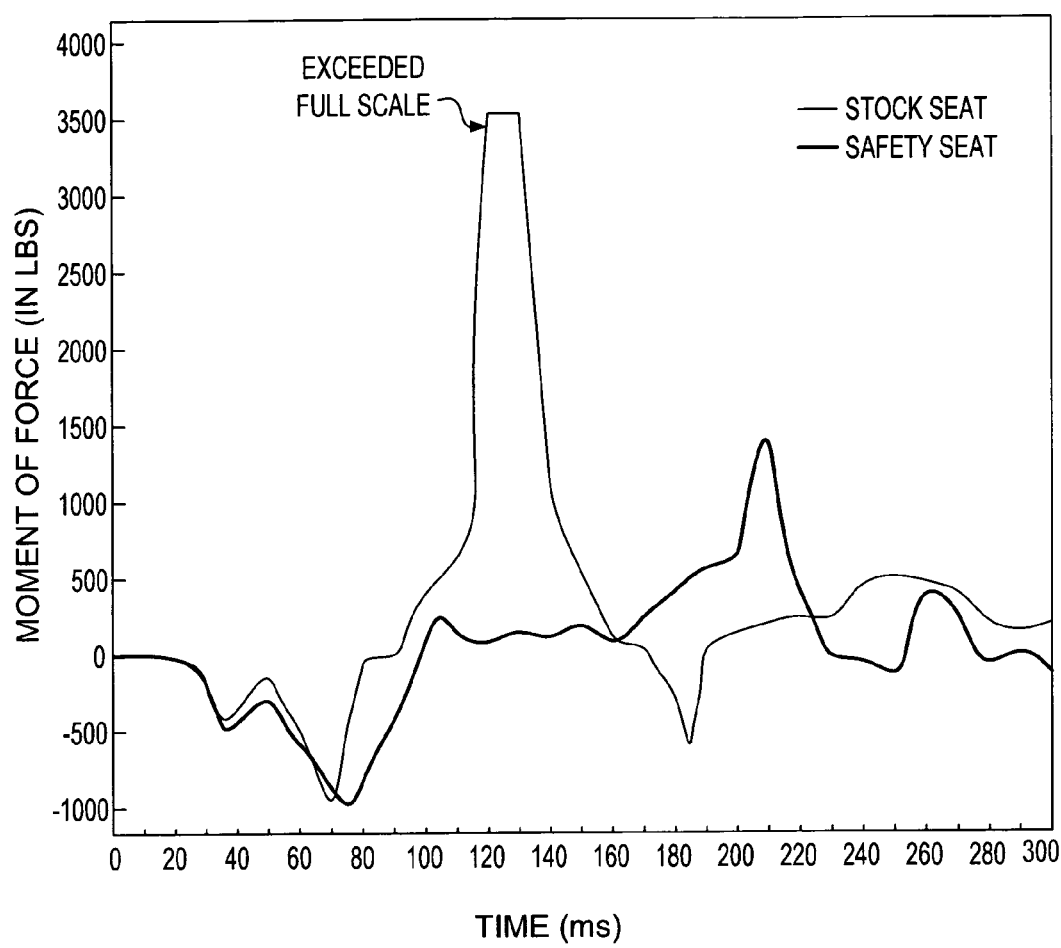
FIG. 20 contains a graph in which the moments of force on the left upper tibia of safety seat and stock seat dummies are plotted as a function of time after sled pulse.

FIG. 20 contains a graph in which measurements of the moment of force on the left upper tibia of the safety seat and stock seat dummies are plotted as a function of time after sled pulse. The null reference time, t=0, is the instant at which the sled pulse was initiated. The maximum moment of force in units of inch-pound-force (in-lbf) to the left upper tibia of the dummy in the safety seat was 1358 in-lbf at 208 ms. The maximum measured moment of force measured to the left lower tibia of the dummy occupying the stock seat was 3536 in-lbf at 120 ms, which increased to exceed full scale for a period of about 20 ms.

Results of measurements on other body parts of the dummies included the following:

Neck load: safety seat, maximum value (max.) 286 lbf at 180 ms, 0 lbf at 250 ms; stock seat, max. 586 lbf at 122 ms, 450 lbf at 250 ms.

Chest acceleration: safety seat, max. 26 G; stock seat, max. 52 G.

Lumbar spine moment of force: safety seat, max. 26 in-lbf; stock seat, max. greater than 5000 in-lbf, exceeded scale.

Left femur, moment of force: safety seat, max. 1373 in-lbf; stock seat, max. greater than 3000 in-lbf, exceeded scale.

Right femur, moment of force: safety seat, max. 2041 in-lbf; stock seat, max. greater than 3000 in-lbf, exceeded scale.

Right upper tibia, moment of force: safety seat, max. 1905 in-lbf; stock seat, max. greater than 3540 in-lbf, exceeded scale.

Left lower tibia, load: safety seat, max. 109 lbf; stock seat, max. 423 lbf.

Right lower tibia, load: safety seat, max. 147 lbf; stock seat, max. 373 lbf.

Left foot longitudinal, acceleration: safety seat, max. 16 G; stock seat, max. 33 G.

Right foot longitudinal, acceleration: safety seat, max. 31 G; stock seat, max. 63 G.

Left foot vertical, acceleration: safety seat, max. 15 G; stock seat, max. 84 G.

Right foot longitudinal, acceleration: safety seat, max. 16 G; stock seat, max. 67 G.

Shoulder belt, load: safety seat, max 4.8 kiloNewtons (kN); stock seat, max. 5.6 kN Thus, the dummy occupying the test safety seat was subjected to considerably less accelerations, loads and moments to all regions of the body than the dummy in the stock seat. The dummy occupying the safety seat experienced safer, that is, smaller and slower, reactions to the sled impulse (simulated crash impact) than the dummy in the stock seat.

In preferred embodiments in accordance with the invention, a signal from a pre-crash detection system (or other initiator) initiates deployment of a safety seat before the first impact. Initiation of deployment before the first impact generally enhances the protection of a seat occupant compared to deployment at the time of first impact or after first impact.

Figure 21:
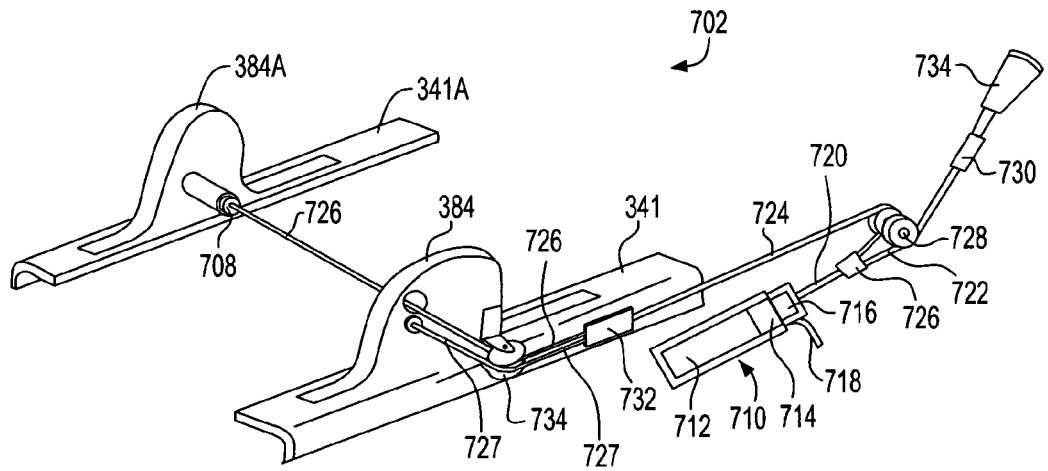
FIG. 21 depicts a perspective view of a pretensioner system operable both as controllable lock and release device and as a seat belt pretensioner in a normal configuration.
Figure 22:
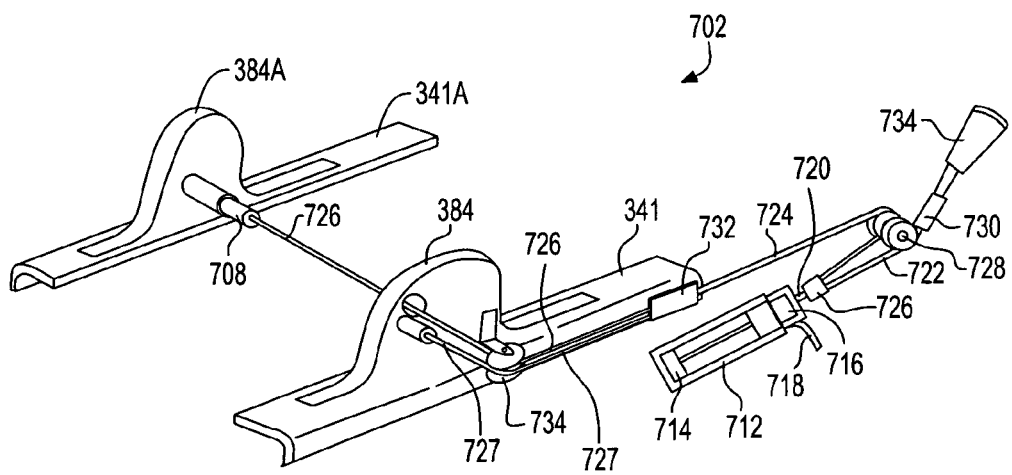
FIG. 22 depicts a perspective view of the pretensioner system of FIG. 21 in a deployed status contemporaneous with a vehicle crash.

FIG. 21 depicts schematically a perspective view of a pretensioner system 702 operable both as controllable lock and release device and as a seat belt pretensioner. Pretensioner system 702 is disposed in a normal configuration for normal traveling conditions. Pretensioner system 702 is operable to provide a lock and release function to switch a movable shaft, between a lock position and a release position in a safety seat frame; for example, movable shafts 392, 537 in safety seat frames 302, 502, respectively. FIG. 22 depicts a perspective view of pretensioner system 702 in a deployed status contemporaneous with a vehicle crash.

Pretensioner system 702 comprises two movable shafts 708. Each movable shaft 708 functions as a slidable bolt in a slide bolt latch, as described above with reference to vehicle safety seats 302 and 502. A movable shaft 708 in a lock status, as depicted in FIG. 21, holds a rear support (not shown) of a vehicle safety seat in its normal configuration. A movable shaft 708 in a release status, as depicted in FIG. 22, releases a rear support of a vehicle safety seat and allows it to move into a deployed position. Without being restricted to any particular arrangement or assembly of parts, FIGS. 21 and 22 depict bracket 384 (and 384A) and upper member 341 (and 341A) as described above with reference to FIGS. 11 and 12.

Pretensioner system 702 comprises a pyrotechnic ignition unit 710 having a locking unit 712, a piston 714, a gas generator 716 with squib, and electrical connector 718 connected to a pre-crash detection system (PDS, not shown). Pretensioner system 702 further comprises a pretensioner cable 720, a seatbelt cable 722 and a main triggering cable 724. Pretensioner cable 720 is connected to piston 714. System 702 includes a first cable connector 726 that connects pretensioner cable 722 to both seatbelt cable 722 and main triggering cable 724. System 702 further comprises a double wheel 728, a belt connector 730 and a second cable connector 732. Seatbelt cable 722 travels over double wheel 728 to belt connector 730. Belt connector 730 connects seatbelt cable 722 to seatbelt buckle 734. Main triggering cable 724 travels over double wheel 728 to second cable connector 732. Second connector 732 connects main triggering cable 724 to two local triggering tables 726, 727.

System 702 further comprises a double pulley wheel 734 mounted to bracket 384. Each local triggering cable 726, 727 is connected to a movable shaft 708. A local triggering table 726, 727 travels through double pulley wheel 734, which is located between second cable connector 732 and movable shafts 708.

In its deployed configuration depicted in FIG. 22, piston 714 has plunged through pressure chamber 712 as a result of gas expansion. Expanding gas in pretensioner unit 710 is produced using known techniques upon squib ignition in response to a PDS signal. The movement of piston 714 causes retraction of a pre-set length of pretensioner cable 720, which in turn causes pretensioning of seatbelt cable 722 and triggering tables 724, 726, 727. As depicted in FIG. 22, pretensioning of seatbelt cable 722 pulls seatbelt buckle 734, thereby tightening the seatbelt (not shown). Pretensioning of triggering tables 724, 726, 727 causes retraction of movable shafts 708 from their normal positions. As a result, rear legs of a safety seat (e.g., rear legs 332) are released, causing deployment of the safety seat. For example, used with a safety seat such as safety seat 302, retraction of movable shafts 708 from their normal positions release spring arms 386 (FIGS. 11-12). One skilled in the art will recognize that numerous variations of pretensioner units, suitable for use in a pretensioner system 702 in accordance with the invention, are known in the art and are commercially available.

Figure 23:
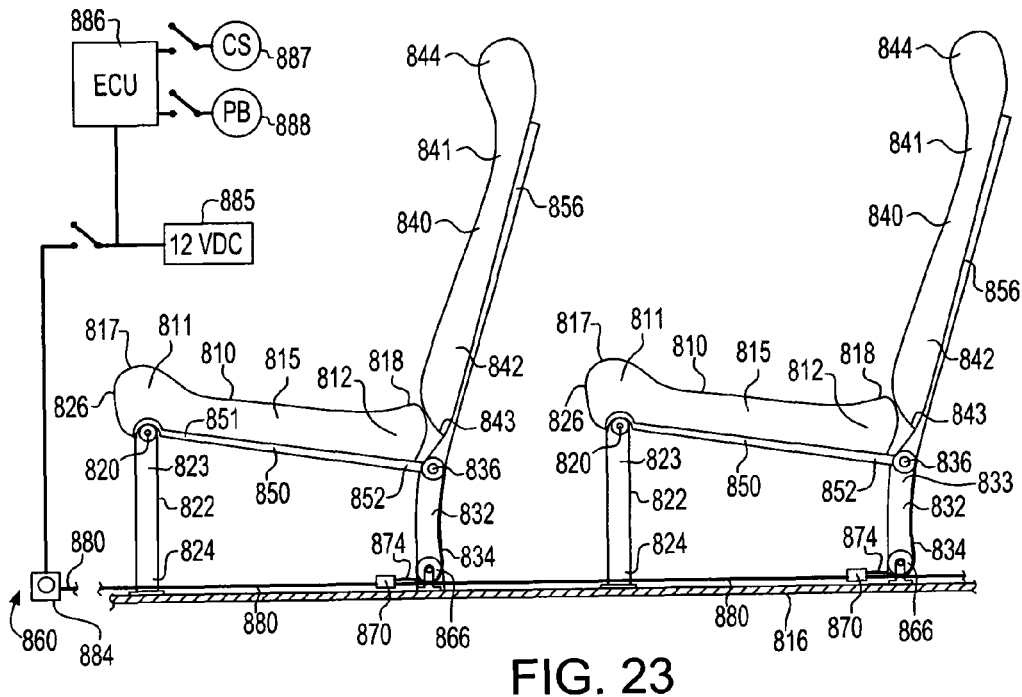
FIG. 23 depicts a side view of a plurality of vehicle safety seats in accordance with the invention disposed in a normal configuration for normal traveling conditions.
Figure 24:
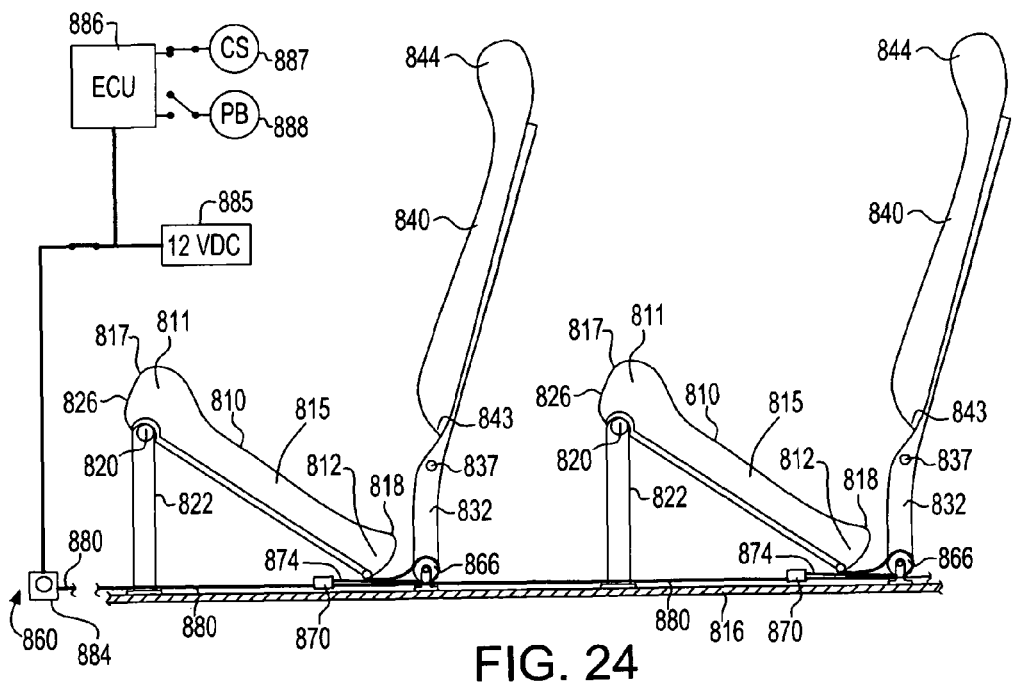
FIG. 24 depicts a side view of the safety seats of FIG. 23 disposed in a deployed configuration contemporaneous with a vehicle crash.

FIG. 23 depicts schematically a side view of a plurality of safety seats 802, 803 in accordance with the invention. Safety seats 802, 803 are disposed in a normal configuration for normal traveling conditions. FIG. 24 depicts schematically a side view of safety seats 802, 803 disposed in a deployed configuration contemporaneous with a vehicle crash. A safety seat 802, 803 is especially suitable for use in commercial vehicles such as buses, trains and airplanes, as well as in passenger automobiles and trucks. Seat 802 includes seat bottom cushion 810 comprising a front region 811, a rear region 812 and middle section 815 between front region 811 and rear region 812. In a normal horizontal orientation for normal traveling conditions, seat bottom cushion 810 is substantially parallel to vehicle floor 816. The top surface of bottom cushion 810 at middle section 814 defines a substantially horizontal plane of cushion 810 in a normal horizontal orientation. The top surface of bottom cushion 810 at front region 811 defines a front top surface 817. The top surface of bottom cushion 810 at rear region 812 defines a rear top surface 818.

Safety seat 802 comprises a front pivot 820 located at front region 811 of bottom cushion 810. Seat 802 further comprises front support 822 that supports bottom cushion 810. A front support 822 includes a front support upper end 823 and a front support lower end 824. Lower end 824 is mounted to floor 816. Front support upper end 823 is pivotally connected to front region 811 at front pivot 820. As depicted in view 800 of FIG. 23, while seat bottom cushion 810 is in its normal horizontal orientation, front region 811 includes a front edge 826 that extends downwards from front top surface 827 of cushion 810. In an exemplary embodiment in which seat cushion 810 has a front-to-rear length in a range of about from of about from 42 cm to 62 cm, front edge 826 extends substantially downwards from front top surface 827 a distance in a range of about from 3 cm to 18 cm when bottom cushion 810 is in a normal horizontal orientation.

The height of front top surface 817 above floor 816 in an exemplary embodiment is generally in a range of about from 37 cm to 47 cm, typically about 42 cm. The height of a corresponding front pivot 820 in an exemplary embodiment is in a range of about from 27 cm to 37 cm, typically about 32 cm, that is, approximately 10 cm lower than top surface 817, depending on cushion thickness. The height of corresponding rear top surface 818 above floor 816 in an exemplary embodiment is in a range of about from 30 cm to 40 cm, typically about 35 cm, that is, about 7 cm lower than front top surface 817.

Seat 802 further comprises a rear support 832 that supports seat bottom cushion 810 while seat bottom cushion 810 is in its normal horizontal orientation. Rear support 832 includes a rear support upper end 833 and a rear support lower end 834. Seat 802 further comprises a movable shaft 836 (FIG. 23) integral with rear region 812, and a shaft receiver notch 837 (FIG. 24) integral with rear support upper end 833. Movable shaft 836 and shaft receiver notch 837 are parts of a lock and release mechanism described with reference to FIGS. 25-26. Movable shaft 836 and shaft receiver notch 837 function together as a sliding bolt latch to detachably fasten seat bottom cushion to rear support 832. Retraction of movable shaft 836 out of notch 837 causes seat bottom cushion 810 to fall towards floor 816 under the force of gravity, causing bottom cushion 810 to rotate partially about front pivot 820 from a normal horizontal orientation to a deployed angled orientation (FIG. 24).

Seat 802 further comprises a substantially vertical backrest cushion 840 having an upper region 841 and a lower region 842. Backrest 840 has a backrest bottom 843. As depicted in FIG. 23, seat 802 preferably further comprises a head restraint cushion 844 located proximate to upper region 841 of backrest cushion 840. In some embodiments, as in seat 802, head restraint cushion 844 is an extended portion of backrest cushion 840. In some embodiments, head restraint cushion 844 is separately adjustable and is assembled in seat 802 using techniques known in the art. In a normal backrest position as depicted in FIG. 23, substantially vertical backrest cushion 840 forms a slight angle with floor 816 that deviates slightly from vertical; for example, an angle in a range of about from 2° to 10° from vertical. Backrest cushion 840 in seat 802 remains substantially stable, that is, it does not move significantly contemporaneously with a crash (FIG. 24).

FIG. 24 depicts schematically a side view 870 of safety seat 802 in a deployed configuration operable to shift a seat occupant into a safe posture in accordance with the invention. Seat bottom cushion 810 has moved from a horizontal orientation (FIG. 23) to a deployed angled orientation in which rear region 812 is substantially lower than rear region 812 in its normal orientation. Generally, rear region 812 is lowered by detaching rear region 812 from rear support 832. A mechanism for detaching rear region 812 from rear support 832 is described below. One skilled in the art will recognize that numerous other techniques may be utilized for supporting rear region 812 and for lowering region 812 in accordance with the invention. The height of bottom cushion rear region 812 above floor 816 typically is at least about 10 cm lower than rear region 812 in its normal orientation, preferably at least about 15 cm lower, and more preferably in a range of about from 15 cm to 30 cm lower. Generally, rear region 812 is in a range of about from 10 cm to 40 cm lower than in its normal orientation.

The height of front pivot 820 above floor 816 is unchanged in a deployed configuration of seat 802. Accordingly, in a deployed configuration of seat 802, the height of front region 811 above floor 816 is substantially unchanged. Thus, the height of front top surface 817 of cushion 810 above floor 816 is substantially unchanged.

In a horizontal orientation for normal traveling as depicted in FIG. 23, seat bottom cushion 810 typically has a slightly slanted orientation to maximize traveling comfort. In an exemplary horizontal orientation for normal traveling, rear region 812 of bottom cushion 810 is in a range of about from 2 cm to 12 cm lower than front region 811, and the approximately planar sitting surface of seat bottom cushion 810 forms an angle in a range of about from 2° (degrees) to 10° with the plane of floor 816. In a deployed angled orientation as depicted in FIG. 24, rear region 812 is typically at least about 12 cm lower than front region 811. Generally, in a deployed angled orientation, rear region 812 is in a range of about from 12 cm to 37 cm lower than in its normal horizontal orientation. Accordingly, in a deployed angled orientation, seat bottom cushion 810 forms an angle to vehicle floor 816 generally in a range of about from 20° to 60°, preferably in a range of about from 25° to 50°, and more preferably in a range of about from 30° to 40°. Seat bottom 810 in deployed angled orientation inhibits forward movement of an occupant by forces of inertia. The height of front region 811 and the height of front pivot 820 above floor 816 remain substantially unchanged in deployed seat configuration. In other words, rear region 812 moves lower during deployment while front region 811 remains at substantially the same height. In some embodiments, seat bottom 810 comprises a frontal section and a rear section such as frontal section 213 and rear section 214 described above with reference to FIGS. 5-6.

Safety seat 802 typically comprises a seat bottom frame 850 attached to or integral with said seat bottom cushion 810. An exemplary seat bottom frame has a frame front 851 and a frame rear 852, the frame front 851 being contiguous with front region 811 of bottom cushion 810, frame rear 852 being contiguous with rear region 812 of cushion 810 (FIG. 23). In some embodiments, as depicted in FIGS. 23-24, movable shaft 836 is integral with seat bottom frame 850. In some embodiments, seat bottom 850 comprises a frontal section and a rear section such as frontal section 313 and rear section 314 described above with reference to FIGS. 7-10.

Safety seat 802 typically comprises a backrest frame 856 attached to or integral with backrest cushion 840. In some embodiments, as depicted in FIGS. 23-24, backrest frame 856 is supported by and integral with rear support 832. In embodiments that do not include a 3-point seat belt or other seat belt system having a shoulder sash (shoulder portion), there is no risk of a shoulder portion of the seat belt interfering with an occupant's throat, neck and head if backrest cushion 840 (and backrest frame 856) do not deploy downwards.

Safety seat 802 comprises a lock and release mechanism 860 operable to hold bottom cushion rear region 812 and frame rear 852 in normal horizontal orientation during normal traveling conditions, and further operable contemporaneously with a vehicle crash to retract movable shaft 836 from notch 837 so that seat bottom cushion 810 deploys into its deployed angled orientation. Lock and release mechanism 860 is operable to deploy a plurality of vehicle safety seats 802, 803. In FIGS. 23-24, plurality of vehicle safety seats 802, 803 are arranged front to back. Lock and release mechanism 860 is also operable to deploy a plurality of vehicle safety seats arranged side to side.

As shown in FIG. 24, bottom 843 of backrest 840 and rear region 812 of seat bottom cushion 810 are not integrated or attached or contiguous when seats 802, 803 are in a deployed configuration. Rather there is space between backrest bottom 843 and rear top surface 818, generally in a range of about from 5 cm to 40 cm, more typically in a range of about from 10 cm to 30 cm.

Figure 25:
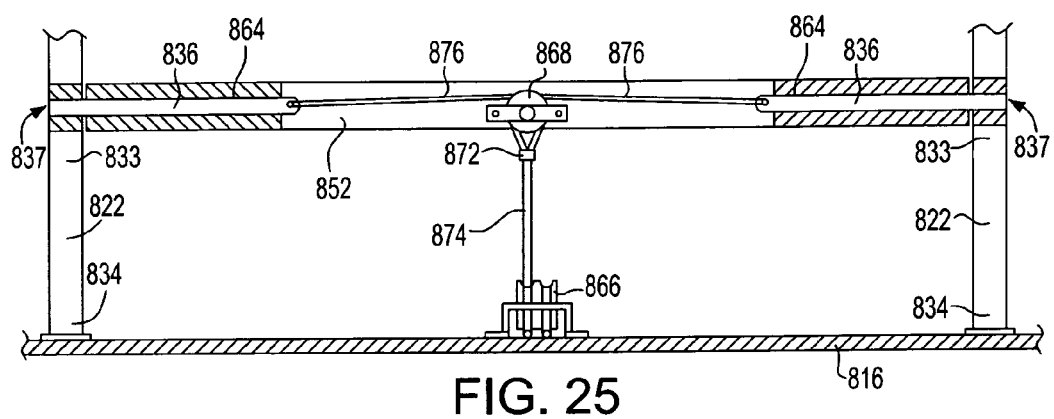
FIG. 25 depicts a detailed front view including slide channels integral with the frame rear of the seat bottom frame of FIG. 23 in a normal configuration.
Figure 26:
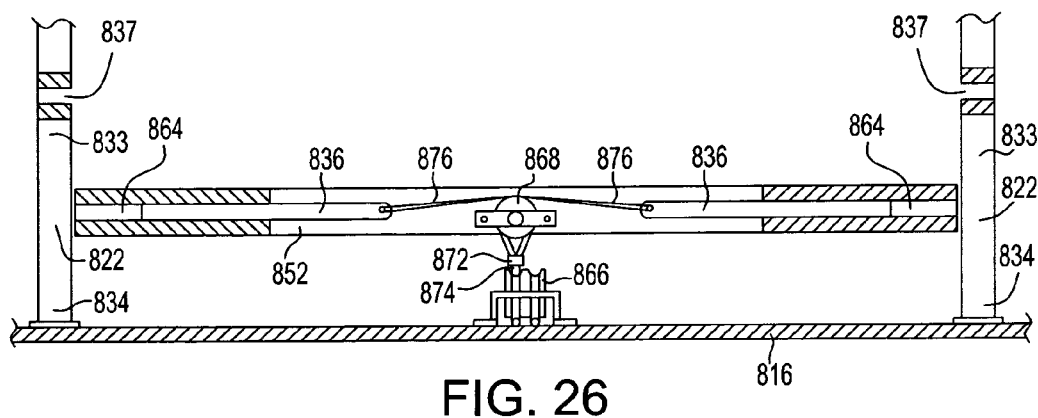
FIG. 26 depicts a detailed front view including slide channels integral with the frame rear of the seat bottom frame of FIG. 24 in a deployed configuration.

FIG. 25 depicts a detailed cross-sectional view of frame rear 852 of seat bottom frame 850. Slide channels 864 are aligned with shaft receiver notches 837 so that movable shafts 836 extend into notches 837 in a normal configuration of safety seats 802, 803 during normal traveling conditions. In the hold status depicted in FIG. 25, lock and release mechanism 860 holds seat bottom cushion 810 and seat bottom frame 850 in their normal horizontal orientation for normal traveling conditions. As depicted in one or more of FIGS. 23-26, each of seats 802, 803 comprises a lower pulley 866, an upper double-wheeled pulley 868, a main cable connector 870, a local cable connector 872, and a main trigger cable 874. Each seat 802, 803 further comprises two local trigger cables 876. Each local trigger cable 876 is connected at one end to a movable shaft 836 and at another end to local cable connector 872. Each local trigger cable 876 passes over a wheel of upper double-wheeled pulley 868, which is attached to rear region 852 of bottom frame 850 between slide channels 864. Main trigger cable 864 is connected at its upper end to local cable connector 872 and at its lower end to main cable connector 870 (FIGS. 23-24). Main trigger cable passes through lower pulley 866, which is mounted to floor 816 between local cable connector 872 and main cable connector 870. Each main cable connector 870 corresponding to one of plurality of seats 802, 803 is attached to a continuous initiator cable 880 (FIGS. 23-24); for example, by a releasable clamp that allows selective adjustment of the attachment location. The "upside" of initiator cable 880 is held by cable tug device 884. Cable tug device 884 uses one of several possible techniques to pull initiator cable 880 towards device 884; for example, by quickly winding cable 880 on a spool, or simply holding cable 880 and jerking it. Cable tug device 884 has a 12 V power supply 885 that is controlled by electronic control unit (ECU) 886 (FIGS. 23-24). ECU 886 is activated contemporaneously with the vehicle crash by one or more of crash sensor (CS) 887 and push button (PB) 888. In some embodiments, push button 888 is a manual button disposed on a steering wheel. In some embodiments, push button 888 is a foot button disposed on the vehicle floor. When ECU 886 is activated, it activates cable tug device 884, which pulls up a pre-selected length of initiator cable 880, thereby initiating deployment of safety seats 802, 803 into a deployed configuration (FIGS. 24, 26). Main trigger cables 874 of seats 802, 803 are connected to the "downside" of main connector 870. As cable tug device 884 tugs the initiator cable 880 to the "upside" (to the left in FIGS. 23-24), it pulls each of main connectors 870 in the same direction, which in turn pull main trigger cables 874. The horizontal travel of each main connector 870 is translated through main trigger cable 874 and lower pulley 866 into downward movement of local cable connector 872. In turn, local cable connector 872 pulls local cables 876 downwards, and upper double-wheeled pulley 868 translates the downward movement into lateral movement of local trigger cables 876. As a result, each local trigger cable 876 polls movable shaft 836 towards upper pulley 868, thereby retracting movable shaft 836 from shaft receiver notch 837 (FIG. 26). Retraction of movable shafts 836 releases rear region 852 of seat bottom frame 850 from its normal hold position, resulting in rear region 852 being lowered. This causes seat bottom cushion 810 and seat bottom frame 850 to rotate downwards about front pivot 820 into a deployed angled orientation in accordance with the invention. As a result, safety seats 802 and 803 are transformed into a deployed configuration (FIG. 24) simultaneously. Additional main cable connectors 870 corresponding to additional safety seats attached along the length of initiator cable 880 translate initiation of deployment further down a sequence of safety seats. A feature of a lock and release system 860 as described with reference to FIGS. 23-26 is that deployment of a plurality of safety seats is activated and initiated by a single controller 886 and a single cable tug device 884. The number of safety seat deployments initiated by a single cable tug device 884 depends on the power deliverable by the motor powering cable tug device 884. One of ordinary skill in the art will recognize that the power requirements for cable tug device 884 depend on numerous variables, such as friction in notch 837, friction in pulleys 866 and 868, cable size, cable material, and cable lengths. Although plurality of safety seats 802, 803 described with reference to FIGS. 23-26 are arranged in a column (longitudinally), one skilled in the art will recognize that a lock and release mechanism described with reference to FIGS. 25-26 is useful for initiating and triggering deployment of a plurality of safety seats arranged in a row (laterally) or in other patterns. Some embodiments of safety seats 802, 803 utilize alternative lock and release mechanisms, for example, mechanisms similar to those described above with reference to FIGS. 11, 12, 17-18, 21-22.

The particular systems, devices and methods described herein are intended to explain the functionality and versatility of the invention, but should not be construed to be limited to those particular embodiments. It is evident that those skilled in the art may now make numerous uses and modifications of the specific embodiments described, without departing from the inventive concepts. It is also evident that the steps recited may, in some instances, be performed in a different order; or equivalent structures and processes may be substituted for the structures and processes described. Since certain changes may be made in the above systems and methods without departing from the scope of the invention, it is intended that all subject matter contained in the above description or shown in the accompanying drawings be interpreted as illustrative and not in a limiting sense. Consequently, the invention is to be construed as embracing each and every novel feature and novel combination of features present in or inherently possessed by the systems, devices and methods described in the claims below and by their equivalents.

The invention claimed is:
1. A vehicle safety seat, comprising:
   a seat bottom frame having a front region and a rear region;
   a front support having an upper end and a lower end;
   a front pivot pivotally connecting said front region and said upper end,
   said seat bottom frame being rotatable about said front pivot so that said seat bottom frame is movable contemporaneously with a vehicle crash substantially instantly from a normal horizontal orientation for normal traveling conditions to a deployed angled orientation, wherein in said normal horizontal orientation said seat bottom frame is substantially parallel to a vehicle floor, and wherein said front pivot has a spatial location in a deployed configuration that is substantially the same as its spatial location immediately before initiation of deployment; and
   a substantially vertical backrest frame, said backrest frame being movable contemporaneously with a crash substantially instantly from a normal backrest position for normal traveling conditions to a deployed backrest position, said backrest frame being movable rearwards and downwards to said deployed backrest position, said backrest frame in said normal backrest position defining a backrest angle with resect to the vehicle floor, and said backrest frame in said deployed backrest position defining a substantially equal angle;
   wherein in said deployed angled orientation said rear region of said seat bottom frame is at least about 10 centimeters (cm) lower than said rear region in said normal horizontal orientation.
2. A vehicle safety seat as in claim 1 wherein:
   in said deployed angled orientation said rear region is at east about 16 cm lower than said front region.

3. A vehicle safety seat as in claim 1 wherein:
said seat bottom frame in said deployed angled orientation forms an angle to said vehicle floor in a range of about from 25 degrees to 50 degrees.

4. A vehicle safety seat as in claim 1 wherein:
said front region of said seat bottom frame in said deployed angled orientation is not substantially higher or lower relative to said vehicle floor than said front region of said seat bottom frame in said normal horizontal orientation.

5. A vehicle safety seat as in claim 1 wherein:
said backrest frame in said deployed backrest position is at least about 4 cm backwards from said backrest frame in said normal backrest position; and
said backrest frame in said deployed backrest position is at least about 4 cm closer to said vehicle floor than said backrest frame in said normal backrest position.

6. A vehicle safety seat as in claim 1, further comprising:
a pre-crash detection system operable to initiate movement of said seat bottom frame into said deployed angled orientation and movement of said backrest frame into said deployed backrest position before an imminent crash.

7. A vehicle safety seat as in claim 1, further comprising:
a rear support having an upper end and a lower end, said upper end being connected to said rear region of said seat bottom frame, said rear support being movable downwards, a downward movement of said rear support lowering said rear region and causing said seat bottom frame to rotate partially about said front pivot from said normal horizontal orientation to said deployed angled orientation.

8. A vehicle safety seat as in claim 7, comprising:
a lock and release mechanism operable to hold stable said lower end of said rear support during normal traveling conditions and to translate said lower end contemporaneously with a vehicle crash from a lower end hold location to a lower end deployed location, thereby lowering said rear support and said rear region of said seat bottom frame.

9. A vehicle safety seat as in claim 1 wherein said seat bottom frame comprises:
a rear section integral with said rear region, said rear section slanting upwards and rearwards from a substantially horizontal plane of said seat bottom frame in said normal horizontal orientation.

10. A vehicle safety seat as in claim 1, further comprising:
a seat belt; and
a belt rolling device proximate to a backrest shoulder;
wherein said seat bottom frame in said deployed angled orientation and said backrest frame in said deployed backrest position define a space between said rear region and a backrest bottom in a range of about from 5 cm to 40 cm; and
wherein said belt rolling device enables said seat belt to follow a seat occupant downwards with said backrest frame during deployment to avoid undesired interaction of said seat belt with a seat occupant.

11. A vehicle safety seat, comprising:
a seat bottom having a front region and a rear region;
a front support having an upper end and a lower end;
a front pivot pivotally connecting said seat bottom front region and said front support upper end, said seat bottom being rotatable about said front pivot so that said seat bottom is movable contemporaneously with a vehicle crash substantially instantly from a normal horizontal orientation for normal traveling conditions to a deployed angled orientation, wherein in said normal horizontal orientation said seat bottom is substantially parallel to a vehicle floor; and
a substantially vertical backrest, said backrest being movable contemporaneously with a crash substantially instantly from a normal backrest position for normal traveling conditions to a deployed backrest position, said backrest being movable rearwards and downwards to said deployed backrest position, said backrest in said normal backrest Position defining a backrest angle with respect to the vehicle floor, and said backrest in said deployed backrest position defining a substantially equal angle;
wherein said front pivot has a spatial location in a deployed configuration that is substantially the same as its spatial location immediately before initiation of deployment; and
wherein in said deployed angled orientation said seat bottom rear region is at least about 10 centimeters (cm) lower than said seat bottom rear region in said normal horizontal orientation.

12. A vehicle safety seat as in claim 11 wherein:
in said deployed angled orientation, said seat bottom rear region is in a range of about from 13 cm to 40 cm lower than said seat bottom rear region in said normal horizontal orientation.

13. A vehicle safety seat as in claim 11, further comprising:
a rear support having an upper end and a lower end, said seat bottom rear region being detachably fastened to said rear support upper end, a detachment of said seat bottom rear region from said rear support upper end being operable to lower said seat bottom rear region and to cause said seat bottom to rotate partially about said front pivot from said normal horizontal orientation to said deployed angled orientation.

14. A vehicle safety seat as in claim 11 wherein:
said seat bottom in said deployed angled orientation and said backrest in said deployed backrest position define a space between said seat bottom rear region and a backrest bottom of said backrest in a range of about from 5 cm to 40 cm.

15. A vehicle safety seat as in claim 11 wherein:
said seat bottom in said deployed angled orientation and said backrest in said deployed backrest position define a space between said seat bottom rear region and a backrest bottom of said backrest in a range of about from 10 cm to 40 cm.

16. A vehicle safety seat as in claim 11, further comprising a seat belt; and
a belt rolling device proximate to a backrest shoulder;
wherein said belt rolling device enables said seat belt to follow a seat occupant downwards with said backrest during deployment to avoid undesired interaction of said seat belt with said seat occupant.

17. A method of transforming the geometry of a vehicle seat to protect a seat occupant, comprising:
pivoting a seat bottom about a front pivot that pivotally connects a front region of said seat bottom and the upper end of a front support, wherein said pivoting occurs substantially instantly contemporaneously with a vehicle crash, and said pivoting moves said seat bottom from a substantially horizontal orientation to a deployed angled orientation in which a rear region of said seat bottom is lower than said front region of said seat bottom; and
moving substantially instantly contemporaneously with said vehicle crash a substantially vertical backrest from a normal backrest position to a deployed backrest position by moving said backrest rearwards and downwards to said deployed backrest position, said backrest in said normal backrest position defining a backrest angle with respect to the vehicle floor, and said backrest in said deployed backrest position defining a substantially equal angle;

wherein said front pivot has a spatial location in said deployed configuration that is substantially the same as its spatial location immediately before initiation of deployment; and wherein in said deployed angled orientation said rear region is at least about 10 centimeters (cm) lower than said rear region in said substantially horizontal orientation.

18. A method as in claim 17 wherein:

in said deployed angled orientation said rear region of said seat bottom is in a range of about from 15 cm to 35 cm lower than said rear region in said substantially horizontal orientation.

19. A method as in claim 17 wherein said pivoting said seat bottom comprises:

lowering a rear support connected to said rear region of said seat bottom, thereby lowering said rear region and causing said seat bottom to rotate partially about said front pivot from said substantially horizontal orientation to said deployed angled orientation.

20. A method as in claim 17 wherein said pivoting said seat bottom comprises:

detaching a rear region of said seat bottom from a rear support to which it is fastened, thereby lowering said rear region and causing said seat bottom to rotate partially about said front pivot from said substantially horizontal orientation to said deployed angled orientation.

21. A method as in claim 17 wherein:

said seat bottom in said deployed angled orientation and said backrest in said deployed backrest position define a space between said rear region of said seat bottom and a backrest bottom of said backrest in a range of about from 5 cm to 40 cm.

22. A method as in claim 21 wherein:

said seat bottom in said deployed angled orientation and said backrest in said deployed backrest position define a space between said rear region of said seat bottom and a backrest bottom of said backrest in a range of about from 10 cm to 30 cm.

* * * * *